United States Patent
Urita

(10) Patent No.: US 7,274,645 B2
(45) Date of Patent: Sep. 25, 2007

(54) REPRODUCTION SIGNAL PROCESSING APPARATUS AND OPTICAL DISC PLAYER INCLUDING THE SAME

(75) Inventor: Kouichi Urita, Saijo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 464 days.

(21) Appl. No.: 10/862,361

(22) Filed: Jun. 8, 2004

(65) Prior Publication Data

US 2005/0002306 A1  Jan. 6, 2005

(30) Foreign Application Priority Data

Jun. 10, 2003 (JP) .............................. 2003-164988

(51) Int. Cl.
*G11B 7/00* (2006.01)
(52) U.S. Cl. ................................. 369/59.22; 369/53.35
(58) Field of Classification Search ............. 369/59.22, 369/59.21
See application file for complete search history.

(56) References Cited

U.S. PATENT DOCUMENTS

| 5,526,339 | A  | * | 6/1996  | Shimada ................... 369/59.19 |
| 5,764,609 | A  | * | 6/1998  | Araki et al. ................ 369/47.4 |
| 6,160,673 | A  | * | 12/2000 | Izumi et al. ................ 360/46 |
| 6,724,706 | B1 | * | 4/2004  | Nakajima et al. ......... 369/59.23 |
| 6,836,457 | B2 | * | 12/2004 | Nakamura et al. ........ 369/59.22 |
| 2003/0016606 | A1 | * | 1/2003 | Urita et al. ............... 369/47.26 |
| 2003/0021208 | A1 | * | 1/2003 | Ogura ....................... 369/59.22 |
| 2003/0137912 | A1 | * | 7/2003 | Ogura ....................... 369/47.39 |

FOREIGN PATENT DOCUMENTS

WO  01/18809  3/2001

OTHER PUBLICATIONS

Co-pending Application of Shinichirou Satoh, U.S. Appl. No. 09/831,299, filed May 8, 2001, entitled "Reproduction Signal Processor".

* cited by examiner

*Primary Examiner*—Wayne Young
*Assistant Examiner*—LaTanya Bibbins
(74) *Attorney, Agent, or Firm*—Wenderoth, Lind & Ponack, L.L.P.

(57) ABSTRACT

A reproduction signal processing apparatus includes: a reproduction unit, an A/D converter for sampling a reproduction signal to obtain a multi-bit digital signal, a phase-locked loop controller for outputting a reproduction clock that is in phase with clock components included in the reproduction signal from an oscillator, a frequency divider for frequency-dividing the reproduction clock, an operation clock switching unit for selecting an operation clock, a filter for performing digital equalization, a filter coefficient learning unit for adaptively controlling the filter coefficients to minimize an equalization error, and an equalization error correcting unit for performing correction so as not to output an abnormal equalization error, thereby performing the adaptive equalization control with stability not only in the channel rate mode but also in the half rate mode that is introduced to suppress the power consumption.

41 Claims, 15 Drawing Sheets

REPRODUCTION SIGNAL PROCESSING APPARATUS AND OPTICAL DISC PLAYER INCLUDING THE SAME

FIELD OF THE INVENTION

The present invention relates to a reproduction technology for equipment that utilizes a storage medium such as an optical disc device and, more particularly, to digital waveform equalization in reproducing reproduction waveforms of a large asymmetry.

BACKGROUND OF THE INVENTION

In recent years, reproduction signal processing apparatuses such as DVD drives demand high-speed reading, and the speed of the reading has been becoming higher year after year. However, a higher reproduction speed leads to an increase in the frequency of an operation clock, which increases power consumption of an LSI that is used for internal signal processing or the like, resulting in a problem such as heating.

To suppress the power consumption, conventional reproduction signal processing apparatuses utilize a technology called half rate mode, which divides the frequency of a reproduction clock that is outputted from an oscillator so as to be in phase with clock components included in the reproduction signal, and uses the frequency-divided reproduction clock as an operation clock, thereby reducing the power consumption (for example, refer to a pamphlet of International publication No. 01/018809).

In the half rate mode, sampling points are obtained only by dividing sampling points which are obtained at the normal reproduction, i.e., at a time when a reproduction clock that is included in a reproduction signal is used as an operation clock (hereinafter, this is referred to as channel rate mode). Thus, the half rate mode obtains sampling points as many as those in the channel rate mode by interpolating sampling points that should have essentially been obtained by linear interpolation or the like. This interpolation enables to perform adaptive equalization control to the reproduction signal also in the half rate mode, with a circuit structure that is almost the same as in the channel rate mode.

However, when a waveform including a large nonlinear distortion that is called asymmetry is inputted to the conventional reproduction signal processing apparatus, an erroneous equalization target value is set in a provisional judgment means which is used for adaptive equalization control both in the channel rate mode and in the half rate mode, whereby an equalization error is increased and then the adaptive equalization control becomes unstable.

Further, when a waveform having a distortion that is generated in playing a disc of bad pit shape at the high-speed recording is inputted to the apparatus, the equalization error becomes large both in the channel rate mode and in the half rate mode, whereby the adaptive equalization control becomes unstable.

SUMMARY OF THE INVENTION

The present invention has for its object to provide a reproduction signal processing apparatus that can perform a satisfactory adaptive equalization even when a waveform having a large asymmetry or a distortion caused by a bad pit shape is inputted to the apparatus, not only in the normal channel rate mode but also in the half rate mode that is introduced to suppress power consumption in cases where the speed becomes much higher and the frequency of the operation clock becomes higher, and an optical disc player including such reproduction signal processing apparatus.

Other objects and advantages of the invention will become apparent from the detailed description that follows. The detailed description and specific embodiments described are provided only for illustration since various additions and modifications within the spirit and scope of the invention will be apparent to those of skill in the art from the detailed description.

According to a 1st aspect of the present invention, there is provided a reproduction signal processing apparatus comprising: a reproduction unit for reproducing information that is recorded on an optical disc; an A/D converter for converting a reproduction signal that is reproduced by the reproduction unit into a multi-bit digital signal; a phase-locked loop control unit for outputting a reproduction clock that is in phase with clock components included in the reproduction signal, using the multi-bit digital signal; a filter for performing digital equalization to the multi-bit digital signal that is obtained by the A/D converter; a filter coefficient learning unit for adaptively controlling filter coefficients of the filter in accordance with the digitally equalized signal to minimize an equalization error, and the filter coefficient learning unit including an equalization error correcting unit for correcting the equalization error when the reproduction signal of a deteriorated quality is to be equalized. Therefore, it is possible to perform an adaptive equalization control with stability not only in the channel rate mode but also in the half rate mode that is introduced to suppress the power consumption when the speed is further increased, even in cases where a signal of a waveform having a large asymmetry or a waveform including a distortion due to a bad pit shape that is generated at higher-speed recording is inputted to the apparatus, thereby constantly setting satisfactory filter coefficients of the filter to enhance the quality of the equalized signal.

According to a 2nd aspect of the present invention, there is provided a reproduction signal processing apparatus comprising: a reproduction unit for reproducing information that is recorded on an optical disc; an A/D converter for converting a reproduction signal that is obtained by the reproduction unit into a multi-bit digital signal; a phase-locked loop control unit for outputting a reproduction clock that is in phase with clock components included in the reproduction signal using the multi-bit digital signal; a filter for performing digital equalization to the multi-bit digital signal that is obtained by the A/D converter; a filter coefficient learning unit for adaptively controlling filter coefficients of the filter in accordance with the digitally equalized signal to minimize an equalization error; a signal quality judging unit for judging a quality of the reproduction signal; a switching unit for changing a value of a correcting unit switching signal on the basis of a result of the judgment of the signal quality judging unit; and the filter coefficient learning unit including plural equalization error correcting units for correcting the equalization error when the reproduction signal of a deteriorated quality is to be equalized, and switching the plural equalization error correcting units according to the value of the correcting unit switching signal. Therefore, it is possible to perform an adaptive equalization control with stability not only in the channel rate mode but also in the half rate mode that is introduced to suppress the power consumption when the speed is further increased, even in cases where a signal of a waveform having a large asymmetry or a waveform including a distortion due to a bad pit shape that is generated at higher-speed recording is inputted to the apparatus, thereby constantly setting satisfactory filter coefficients of the filter to enhance the quality of the equalized signal.

According to a 3rd aspect of the present invention, there is provided an optical disc player including: a spindle motor for rotating an optical disc; an optical pickup for reading a reproduction signal from the optical disc; a reproduction signal processing apparatus for processing the reproduction signal that is read by the optical pickup; a demodulation circuit for demodulating the signal that is processed by the reproduction signal processing apparatus to perform error correction; a servo control circuit for controlling the spindle motor and the optical pickup; and a system controller for performing a data communication with an external device and controlling respective function blocks, the reproduction signal processing apparatus including: an A/D converter for converting the reproduction signal that is read by the optical pickup into a multi-bit digital signal; a phase-locked loop control unit for outputting a reproduction clock that is in phase with clock components included in the reproduction signal using the multi-bit digital signal; a filter for performing digital equalization to the multi-bit digital signal that is obtained by the A/D converter; a signal quality judging unit for judging a signal quality of the reproduction signal; a filter coefficient learning unit having plural equalization error correcting units for correcting an equalization error when the signal quality judging unit judges that the quality of the reproduction signal is deteriorated, and adaptively controlling filter coefficients of the filter to minimize an equalization error in accordance with the digitally equalized signal; and a switching unit for changing a value of a correcting unit switching signal for switching the plural equalization error correcting units, using a result of the judgment by the signal quality judging unit. Therefore, it is possible to perform an adaptive equalization control with stability not only in the channel rate mode but also in the half rate mode that is introduced to suppress the power consumption when the speed is further increased, even in cases where a signal of a waveform having a large asymmetry or a waveform including a distortion due to a bad pit shape that is generated at higher-speed recording is inputted to the apparatus, thereby constantly setting satisfactory filter coefficients of the filter to enhance the quality of the equalized signal.

DETAILED DESCRIPTION OF THE PREFERRED EMBODIMENTS

Hereinafter, embodiments of the present invention will be described with reference to the drawings.

Embodiment 1

A reproduction signal processing apparatus according to a first embodiment of the present invention will be described with reference to FIGS. 1 to 13.

Figure 1:
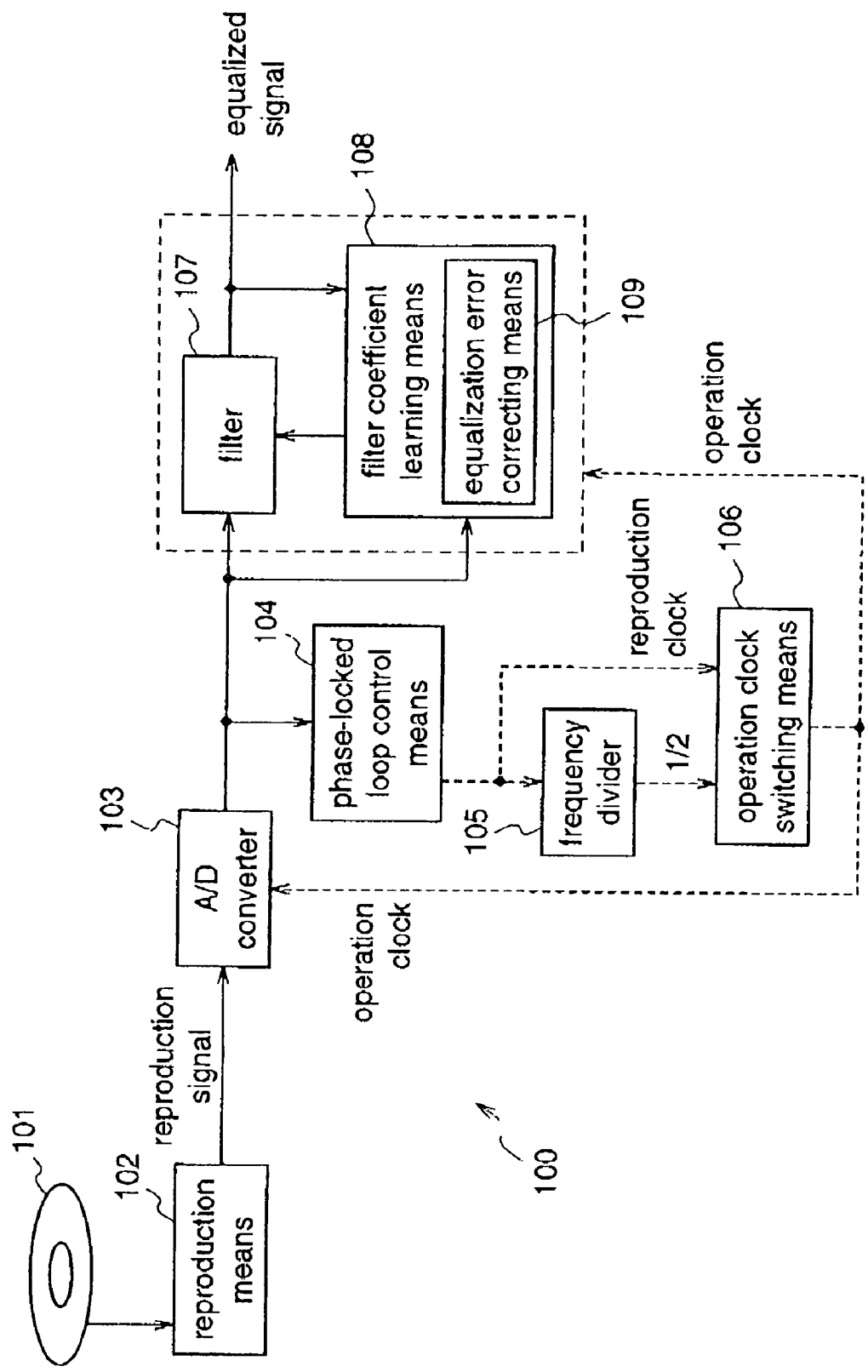
FIG. 1 is a block diagram illustrating a structure of a reproduction signal processing apparatus according to a first embodiment of the present invention.

FIG. 1 is a block diagram illustrating a structure of a reproduction signal processing apparatus 100 according to the first embodiment.

The reproduction signal processing apparatus 100 as shown in FIG. 1 includes a reproduction means 102 for reproducing information that is recorded on an optical disc 101, an analog-to-digital converter (A/D converter) 103 for sampling a reproduction signal that is reproduced by the reproduction means 102 to obtain a multi-bit digital signal, a phase-locked loop control means 104 for outputting a reproduction clock that is in phase with clock components included in the reproduction signal using the multi-bit digital signal that is obtained by the sampling of the A/D converter 103, a frequency divider 105 for frequency-dividing the reproduction clock generated by the phase-locked loop control means 104 to generate a second reproduction clock, an operation clock switching means 106 for selecting one of the reproduction clock and the second reproduction clock and outputting the selected clock as the operation clock, a filter 107 for subjecting the signal obtained by the sampling of the A/D converter 103 to digital equalization, a filter coefficient learning means 108 for adaptively controlling filter coefficients of the filter 107 in accordance with the signal digitally equalized by the filter so as to minimize an equalization error, and an equalization error correcting means 109 for correcting an equalization error when the equalization error that is obtained by the filter coefficient learning means 108 has an abnormal value.

The A/D converter 103 can sample the reproduction signal that is reproduced by the reproduction means 102 to obtain a multi-bit digital signal so as to be in phase with the clock components included in the reproduction signal, using the operation clock selected by the operation clock switching means 106.

Figure 2:
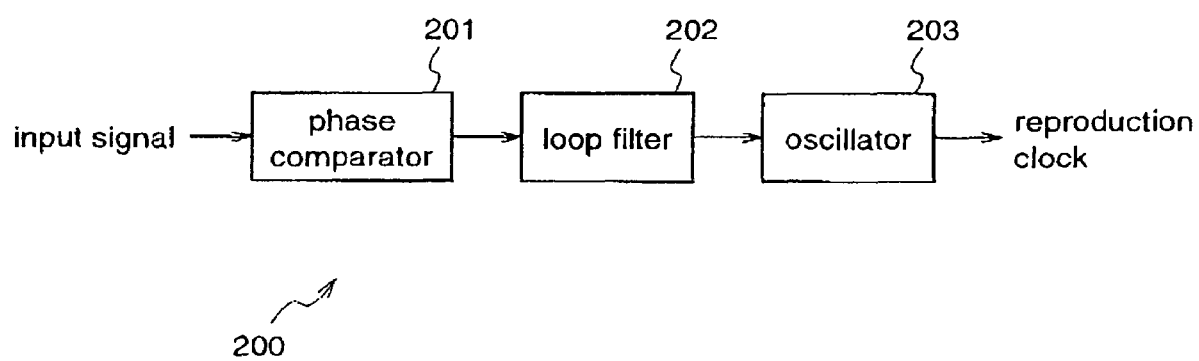
FIG. 2 is a block diagram illustrating a structure of a phase-locked loop control means that is used in the reproduction signal processing apparatus according to the present invention.

As shown in FIG. 2, the phase-locked loop control means 104 comprises a phase comparator 201 for detecting a phase error of the signal outputted from the A/D converter 103, a loop filter 202 for smoothing the phase error signal that is outputted from the phase comparator 201, and an oscillator 203 for outputting a reproduction clock. This phase-locked loop control means 104 detects a phase error between clock components of the reproduction signal that is obtained by the reproduction means 102 and the reproduction clock outputted from the oscillator 203 using the phase comparator 201 and controls the reproduction clock that is outputted from the oscillator 203 so as to eliminate the detected phase error. Thereby, the A/D converter 103 is enabled to perform sampling to obtain a multi-bit digital signal that is in phase with the clock components included in the reproduction signal that is reproduced by the reproduction means 102.

The frequency divider 105 subjects the reproduction clock generated by the phase-locked loop control means 104 to frequency division by two, thereby generating a second reproduction clock having a period that is twice as long as the reproduction clock.

The operation clock switching means 106 switches between the reproduction clock that is generated by the phase-locked loop control means 104 and the second reproduction clock that is generated by the frequency divider 105, to select the operation clock. In this first embodiment, the channel rate mode is selected when the reproduction clock outputted from the oscillator 203 of the phase-locked loop control means 104 is used as the operation clock, while the half rate mode is selected when the reproduction clock that is obtained by frequency-dividing the reproduction clock by two by the frequency divider 105 is used as the operation clock.

Figure 3:
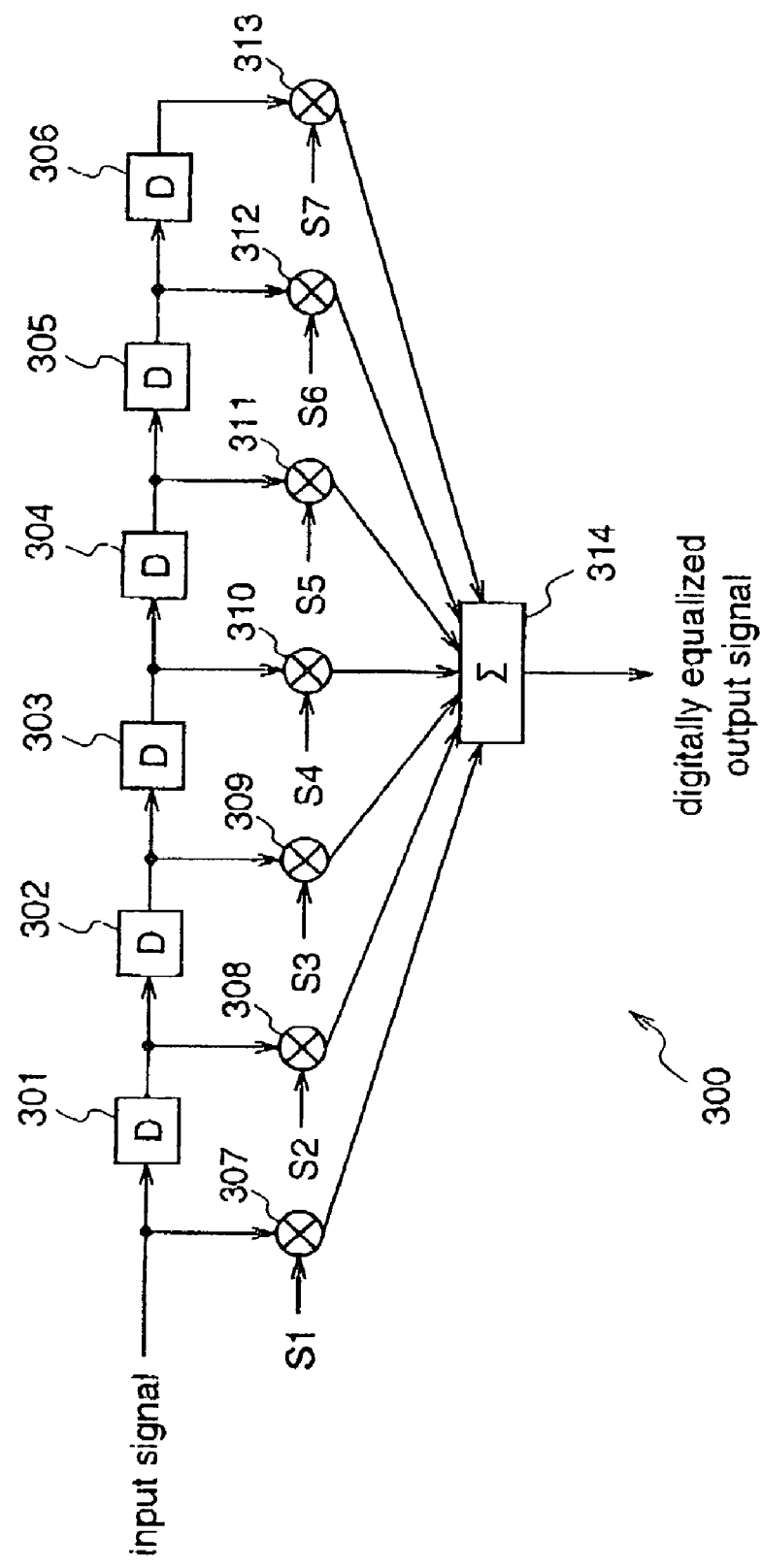
FIG. 3 is a diagram illustrating a structure of a FIR filter according to the present invention.

The filter 107 is constituted by finite taps and is for example a FIR filter (Finite Impulse Response Filter). The equalization characteristics of the FIR filter can be realized by variably changing tap weight coefficients (hereinafter, referred to as filter coefficients). FIG. 3 shows a specific example of the FIR filter. The FIR filter 300 shown here comprises delay elements 301 to 306 for delaying a signal, multiplier elements 307 to 313, and an adder means 314. The filter coefficients S1 to S7 of the FIR filter 300 are those that are adaptively controlled by the filter coefficient learning means 108 so as to minimize the equalization error, thereby adaptively equalizing the output signal from the A/D converter 103.

Figure 4:
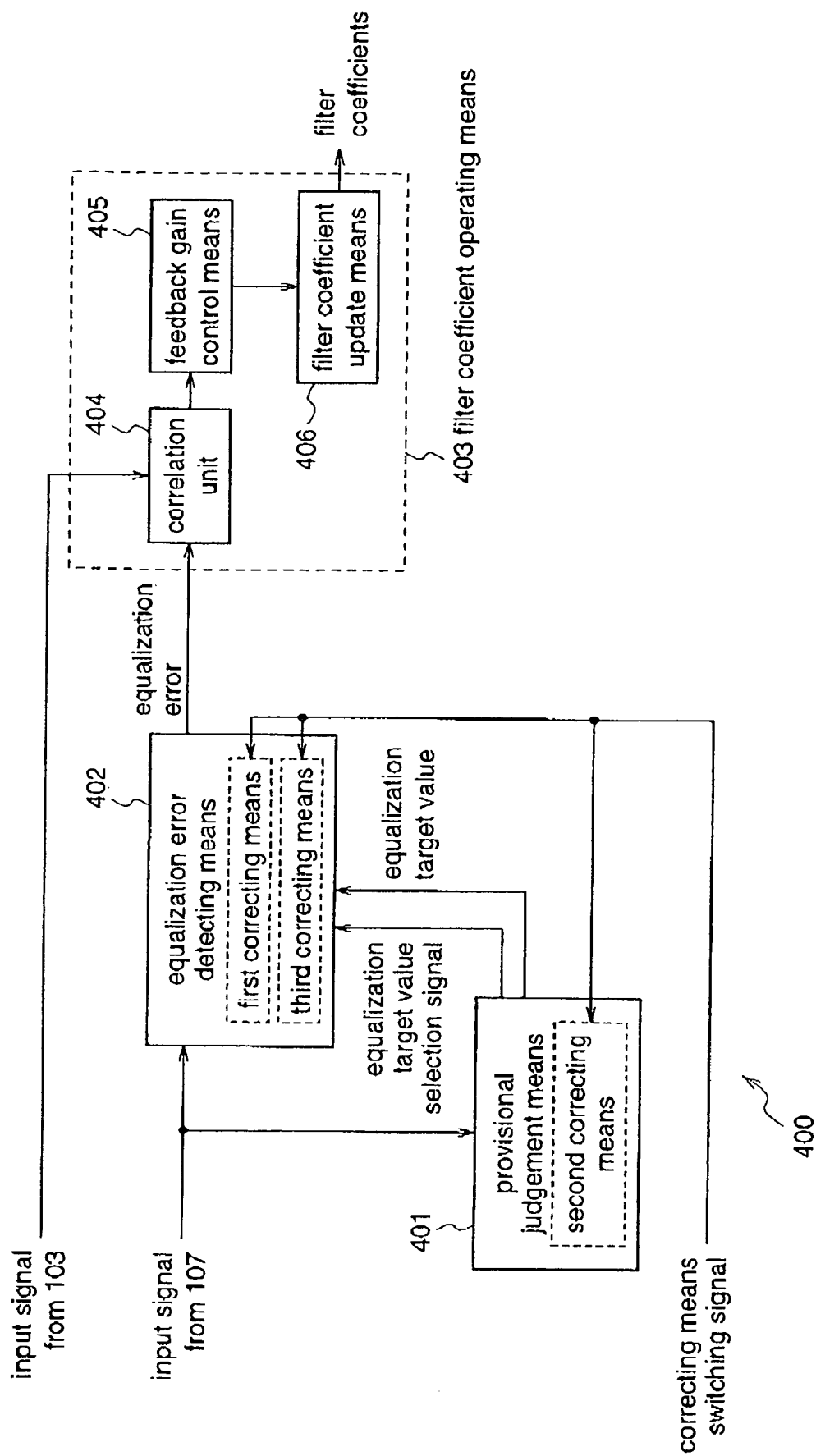
FIG. 4 is a block diagram illustrating a structure of a filter coefficient learning means according to the first embodiment.

The filter coefficient learning means 108 learns the filter coefficients using a LMS (Least Mean Square) algorithm of performing an adaptive control for minimizing the equalization error, and outputs the learned filter coefficients. As shown in FIG. 4, the filter coefficient learning means 108 comprises a provisional judgment means 401 (a provisional judgment selection means (not shown) selects a provisional judgment means 500 in the channel rate mode and a provisional judgment means 700 in the half rate mode, while these provisional judgment means are collectively referred here to as the provisional judgment means 401) for setting an equalization target value on the basis of a signal inputted from the filter 107, an equalization error detecting means 402 for detecting an equalization error using the equalization target value set by the provisional judgment means 401 and the input signal from the filter 107, and a filter coefficient operating means 403 for updating the filter coefficients using the equalization error obtained by the equalization error detecting means 402 and the input signal from the A/D converter 103. Further, the filter coefficient operating means 403 comprises a correlation unit 404 for delaying the output signal from the A/D converter 103 by an amount corresponding to an operation delay that has been generated in obtaining the equalization error, and thereafter performing multiplication of the delayed signal with the equalization error, a feedback gain control means 405 for controlling a feedback gain of the output signal from the correlation unit 404, and a filter coefficient update means 406 for updating the filter coefficients of the filter 107, and performs an operation based on the LMS algorithm.

In this first embodiment, the equalization error correcting means 109 has a first correcting means for correcting the equalization error when the sign of the equalization target value that is set by the provisional judgment means 401 and the sign of the output signal from the filter 107 are different from each other, a second correcting means for correcting the equalization error on the basis of the sign pattern of three successive signals that are outputted from the filter 107, and a third correcting means for correcting the equalization error when the equalization target value is set at the highest level among plural equalization target values, successively by a predetermined number of times, by the provisional judgment means 401 or is set at the lowest level among the plural equalization target values, successively by a predetermined number of times. Here, the first correcting means and the third correcting means are incorporated in the equalization error detecting means 402, and the second correcting means is incorporated in the provisional judgment means 401.

The provisional judgment means in the channel rate mode will be described with reference to FIGS. 5 and 6.

Figure 5:
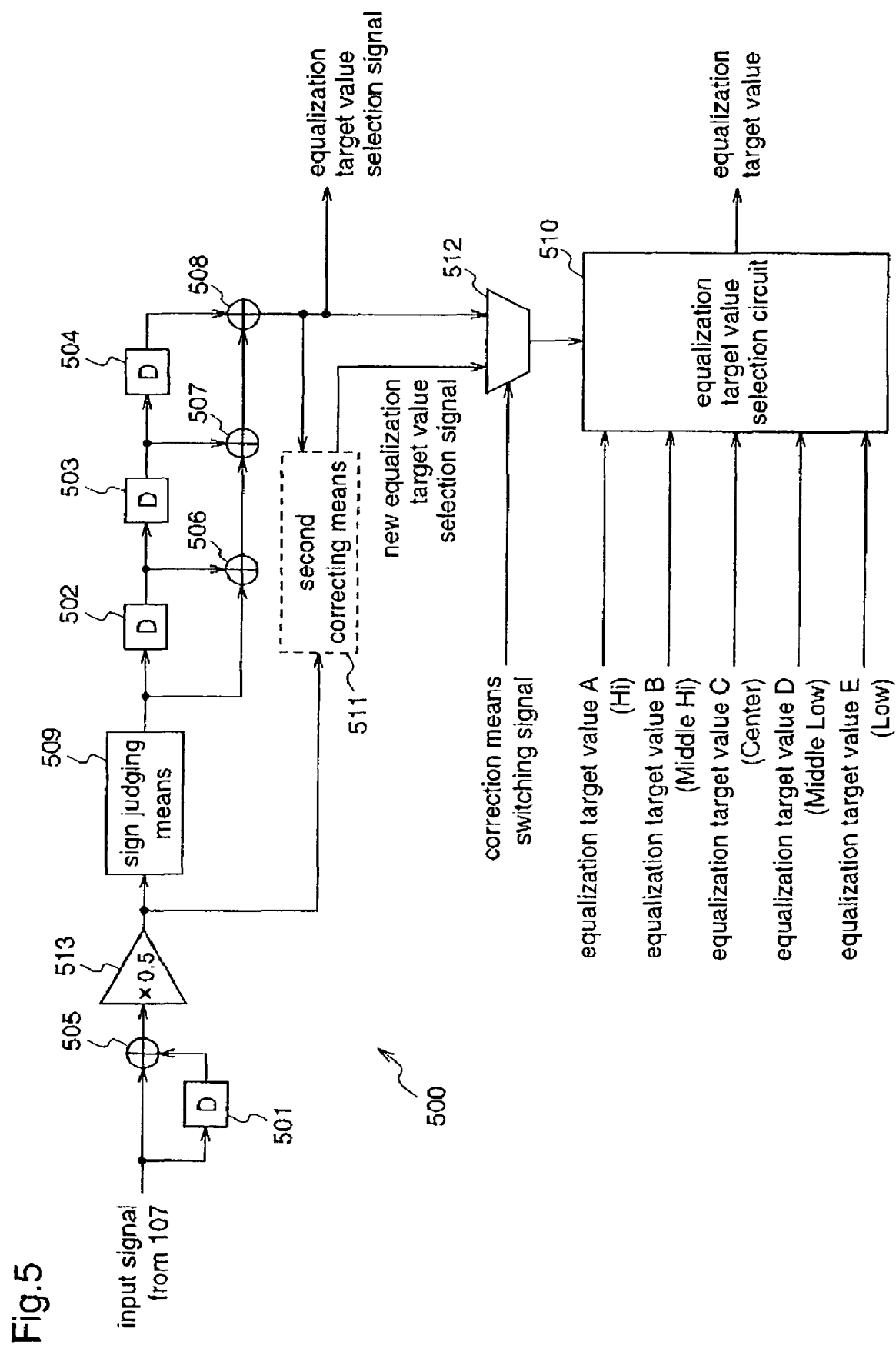
FIG. 5 is a diagram illustrating a structure of a provisional judgment means in the channel rate mode according to the first embodiment.

The provisional judgment means 500 for the channel rate mode as shown in FIG. 5 comprises delay elements 501 to 504, adders 505 to 508, a sign judging means 509, an equalization target value selection circuit 510, a second correcting means 511, a selector 512, and a gain stage 513. Here, the second correcting means 511 and the selector 512 will be described later.

The signal that is outputted from the filter 107 and a signal that is delayed by one clock by means of the delay element 501 are added by the adder 505 and then the obtained signal is multiplied by 0.5 by the gain stage 513 (hereinafter, the above-mentioned processing is referred to as (1+D) processing), thereby obtaining an intermediate value between two sampling points. This processing is shown in FIG. 6.

Figure 6:
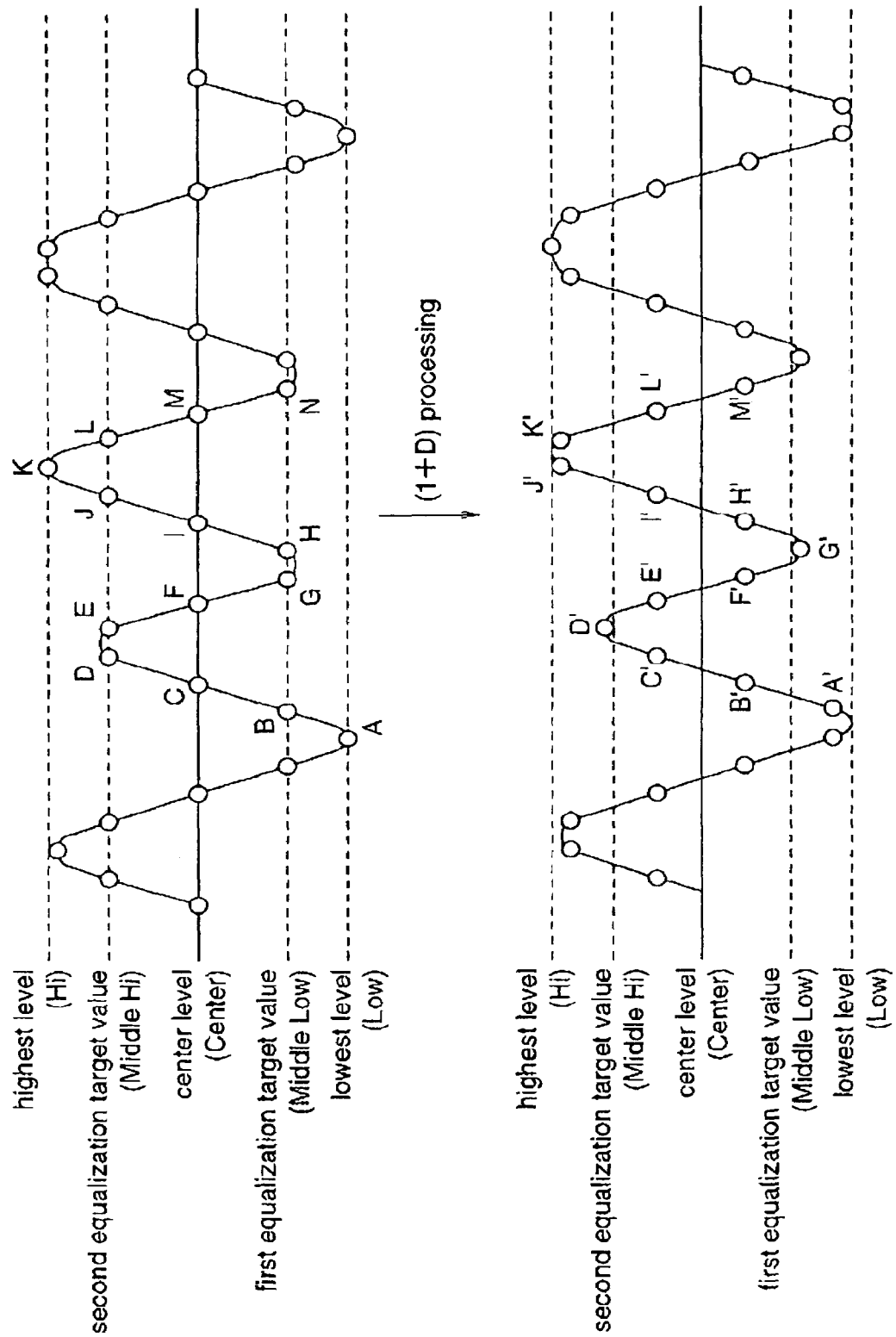
FIG. 6 is a diagram for explaining an operation of the provisional judgment means in the channel rate mode according to the first embodiment.

The upper half of FIG. 6 shows a diagram illustrating a waveform of the input signal from the filter 107, and the lower half shows a diagram illustrating a waveform of a signal that is obtained by subjecting the input signal from the filter 107 to the (1L+D) processing. In FIG. 6, ○ shows a discrete signal of multi values, which is outputted from the filter 107.

The input signal from the filter 107 has five values, i.e., "Hi", "Middle Hi", "Center", "Middle Low", and "Low", as shown in the upper half of FIG. 6. This is because the minimum run length of information (i.e., "0" or "1") which is recorded on the optical disc 101 is 3, that is, the number of successive "0" or "1" is three or more, and a channel from the reproduction means 102 to the filter 107 uses a partial response (3, 4, 4, 3) system.

In this first embodiment, the description will be given of the partial response (3, 4, 4, 3) system and the case where the minimum run length of the information that is recorded on the optical disc 101 is 3, while other systems such as a partial response (1, 2, 2, 1) system may be employed or the minimum run length of the information that is recorded on the optical disc 101 may be any number other than 3. Depending on the combination of the partial response system and the minimum run length of the information that is recorded on the optical disc 101, the output signal from the filter 107 does not have five values. For example, when the partial response (1, 2, 2, 1) system and the minimum run length of 2 are combined, the input signal from the filter 107 has seven values, but in this case the same processing can be carried out by setting a highest level at the highest level in this first embodiment and a lowest level at the lowest level in this embodiment, and setting the first equalization target value and the second equalization target value at levels both adjoining to the middle level, respectively.

As shown in FIG. 6, when sampling points A and B are subjected to the (1+D) processing, it is possible to obtain A' as an intermediate value between A and B. Similarly, when sampling points B to F are subjected to the (1+D) processing, it is possible to obtain intermediate values B' to E', respectively. The signs of respective sampling points of the signal that has been subjected to the (1+D) processing are judged by the sign judging means 509.

The judgment of the sign is made by outputting "1" when the sign of a sampling point is positive and outputting "0" when the sign is negative. These values corresponding to four sampling points are added to decide an equalization target value selection signal. That is, when the values of four sampling points are all "1", the equalization target value selection signal becomes "4", and when the values of four sampling points are all "0", the equalization target value selection signal becomes "0". Thus, the equalization target value selection signal becomes a signal which takes values "0"~"4".

The equalization target value selection circuit 510 selects an equalization target value according to the value of the equalization target value selection signal. For example, when the equalization target value selection signal is "0", the lowest level (hereinafter, referred to as "Low" level) is selected as the equalization target value, and when the equalization target value selection signal is "4", the highest level (hereinafter, referred to as "Hi" level) is selected as the equalization target value. When the equalization target value selection signal is "2", the center level among plural equalization target values (hereinafter, referred to as "Center" level) is selected as the equalization target value. Further, when the equalization target value selection signal is "1", the first equalization target value that is an intermediate level between the lowest level and the center level (hereinafter, referred to as "Middle Low" level) is selected as the equalization target value, and when the equalization target value selection signal is "3", the second target value that is an intermediate level between the highest level and the center level (hereinafter, referred to as "Middle Hi" level) is selected as the equalization target value. Here, these equalization target values are fixed values that can be changed in accordance with the register setting.

A case of deciding an equalization target value for a sampling point D of the signal that is shown in the upper half of FIG. 6 will be described as an example. In order to obtain the equalization target value of the sampling point D, the signs of the intermediate values B'~E' which are obtained from the sampling points B~F are initially judged. Since in this case the sign of the value B' is negative and the signs of the values C'~E' are positive, the equalization target value selection signal becomes "3", and accordingly the equalization target value of "Middle Hi" is selected. In the case of obtaining the equalization target value of the sampling point K, the signs of the intermediate values I'~L' which are obtained from the sampling point I~M are judged. Since the signs of the values I'~L' are all positive in this case, the equalization target value selection signal becomes "4" and thus the equalization target value of "Hi" is selected.

Next, the provisional judgment means in the half rate mode will be described with reference to FIGS. 7 and 8.

Figure 7:
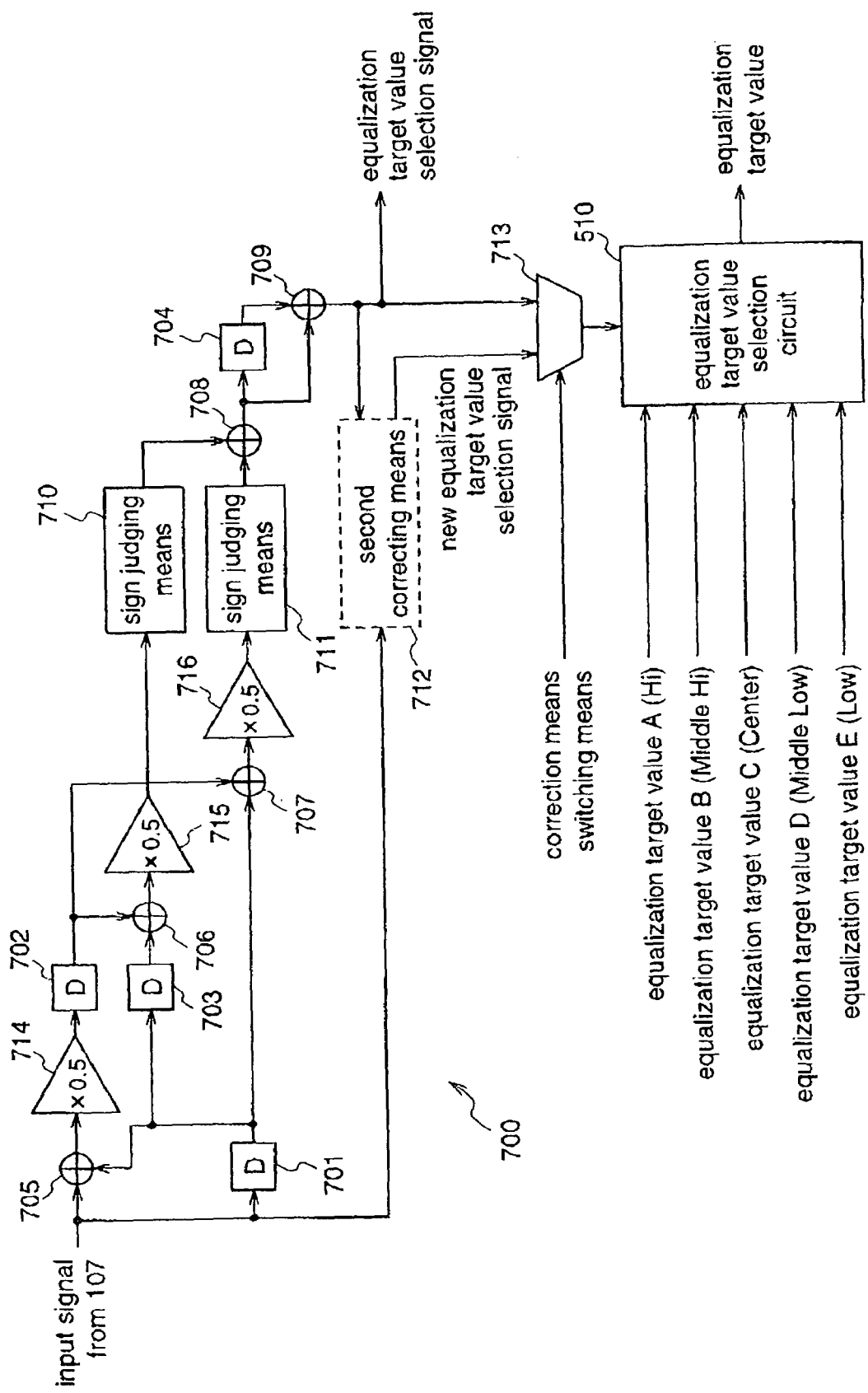
FIG. 7 is a diagram illustrating a structure of a provisional judgment means in the half rate mode according to the first embodiment.

The provisional judgment means 700 for the half rate mode shown in FIG. 7 comprises delay elements 701 to 704, adders 705 to 709, sign judging means 710 to 711, an equalization target value selection circuit 510 as in the channel rate mode, a second correcting means 712, a selector 713, and gain stages 714 to 716. The second correcting means 712 and the selector 713 will be described later.

Figure 8:
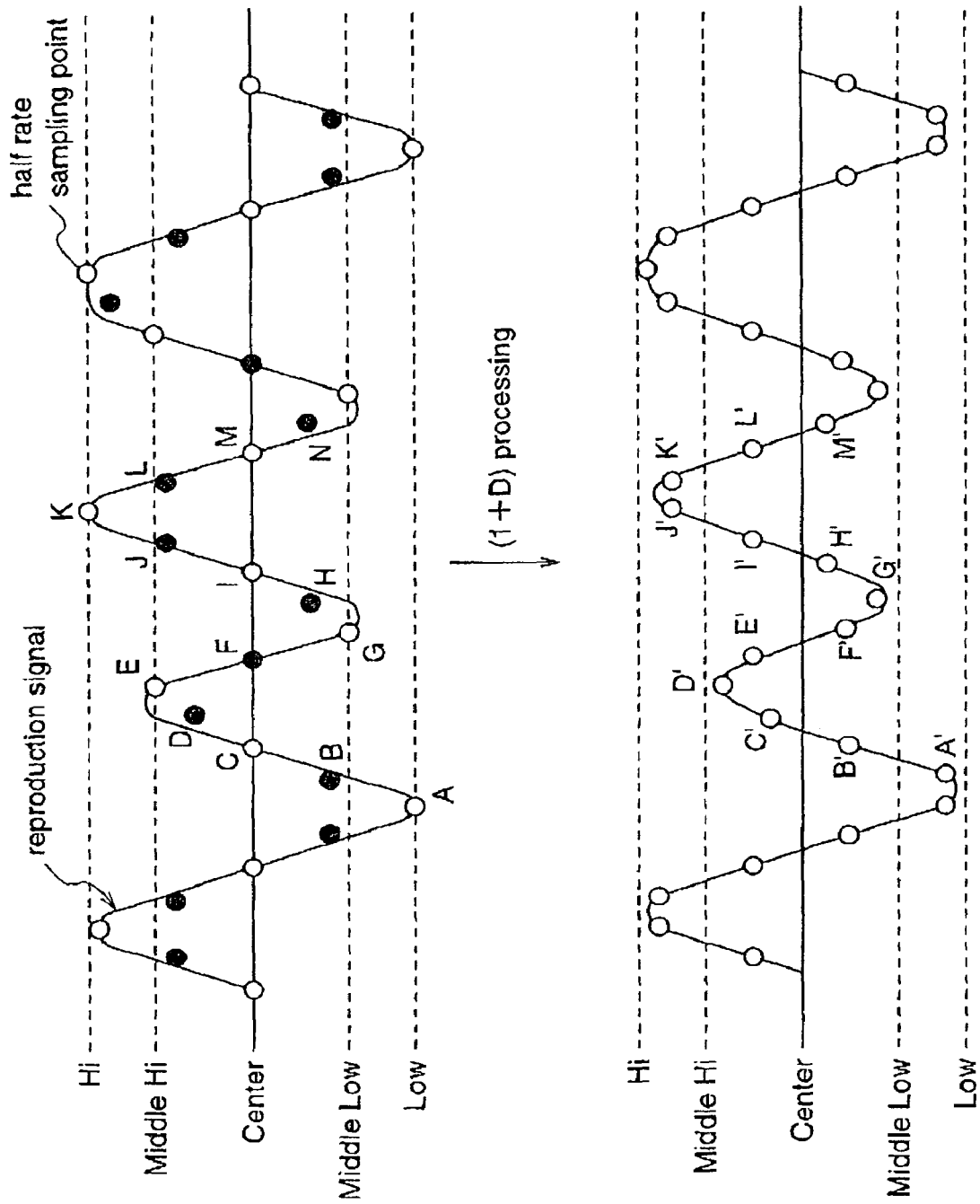
FIG. 8 is a diagram for explaining an operation of the provisional judgment means in the half rate mode according to the first embodiment.

Since, in the half rate mode, the signal outputted from the filter 107 has sampling points half as many as those of the input signal in the channel rate mode as shown by sampling points (○) A, C, E in the upper half of FIG. 8, the input signal from the filter 107 is initially subjected to the (1+D) processing. Thereby, it is possible to obtain sampling points (●) B, D, F, which are intermediate value of the sampling points ○ that are two successive input signals. More specifically, since it is possible to obtain the sampling points as many as those in the channel rate mode, intermediate values such as A'~E' like in the channel rate mode as shown in the lower half of FIG. 8 can be obtained by further performing the (1+D) processing using the sampling points ○ and the sampling points ●. Then, the equalization target value can be selected by the same processing as in the channel rate mode.

In this case, sampling points as many as those in the channel rate mode are obtained by performing the (1+D) processing to the signal that is obtained in the half rate mode, while sampling points as many as those in the channel rate mode may be obtained from plural signals that are obtained in the half rate mode using Nyquist interpolation.

As described above, as the provisional judgment means has different structures and operations in the channel rate mode and in the half rate mode, it adaptively switches the provisional judgment circuit 500 for the channel rate mode and the provisional judgment circuit 700 for the half rate mode, in accordance with the switching of the operation clock.

Figure 9:
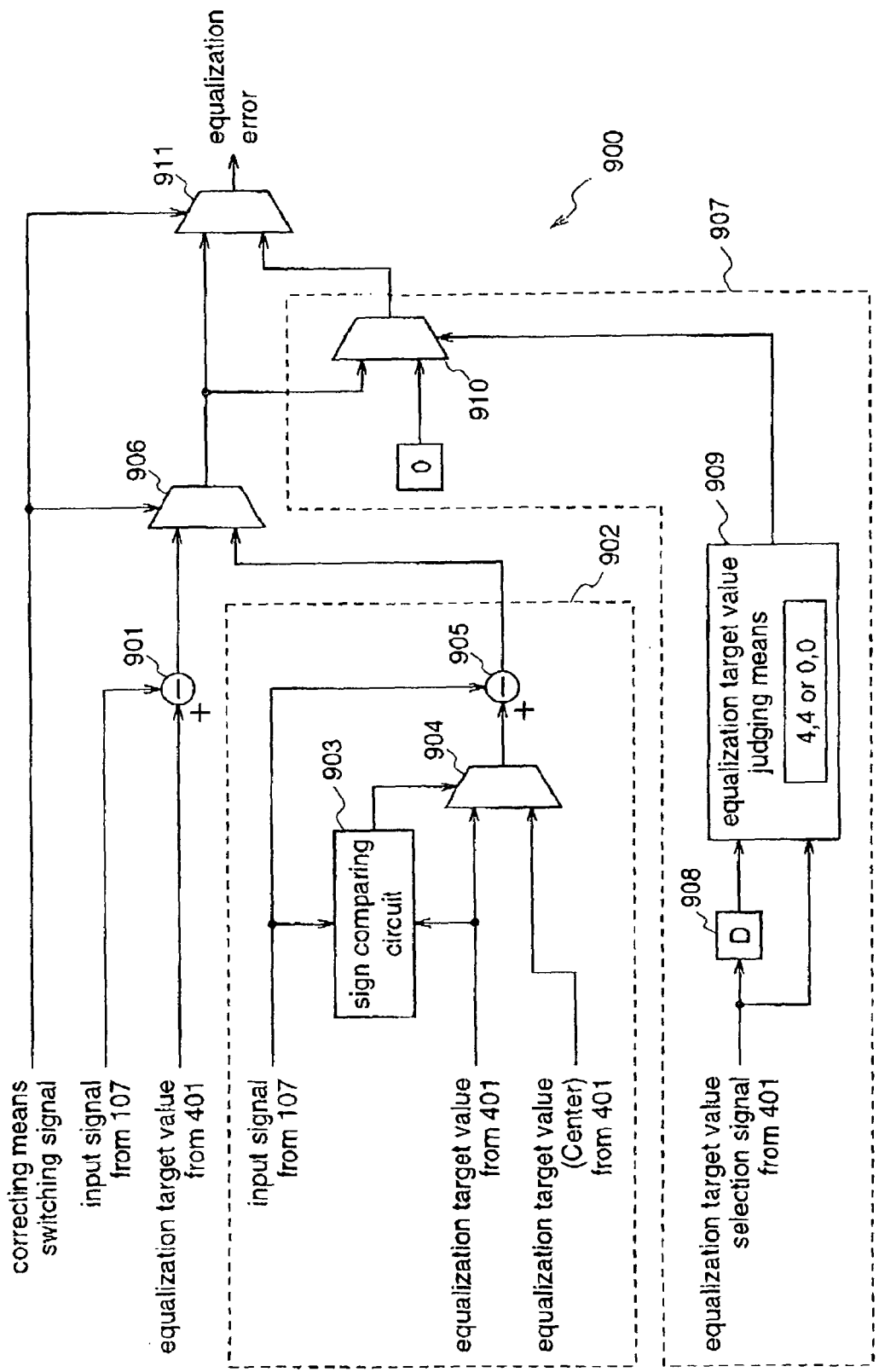
FIG. 9 is a diagram illustrating a structure of an equalization error detecting means according to the first embodiment.

Next, the first correcting means will be described with reference to FIGS. 9 and 10. FIG. 9 illustrates a structure of the equalization error detecting means 402 which obtains an equalization error by subtracting the input signal from the filter 107 from the equalization target value that is outputted from the provisional judgment means 401. In this case, the selector 906 selects one of the output from the subtractor 901 and the output from the subtractor 905 in the first correcting means 902 in accordance with a correcting means switching signal, and the selector 911 selects one of the output from the selector 906 and the output from the selector 910 in the third correcting means 907 in accordance with the correcting means switching signal. Therefore, when the first and third correcting means are not employed, the output signal from the subtractor 901 is outputted as the equalization error.

The first correcting means 902 comprises a sign comparing circuit 903 for comparing the sign of the input signal from the filter 107 and the sign of the equalization target value from the provisional judgment means 401, a selector 904 for selecting an equalization target value that has been judged by the provisional judgment means 401 or compulsorily selecting the equalization target value "Center" on the basis of the result of the comparison of the sign comparing circuit 903, and a subtractor 905 for subtracting the input signal from the filter 107 from the equalization target value selected by the selector 904.

Figure 10:
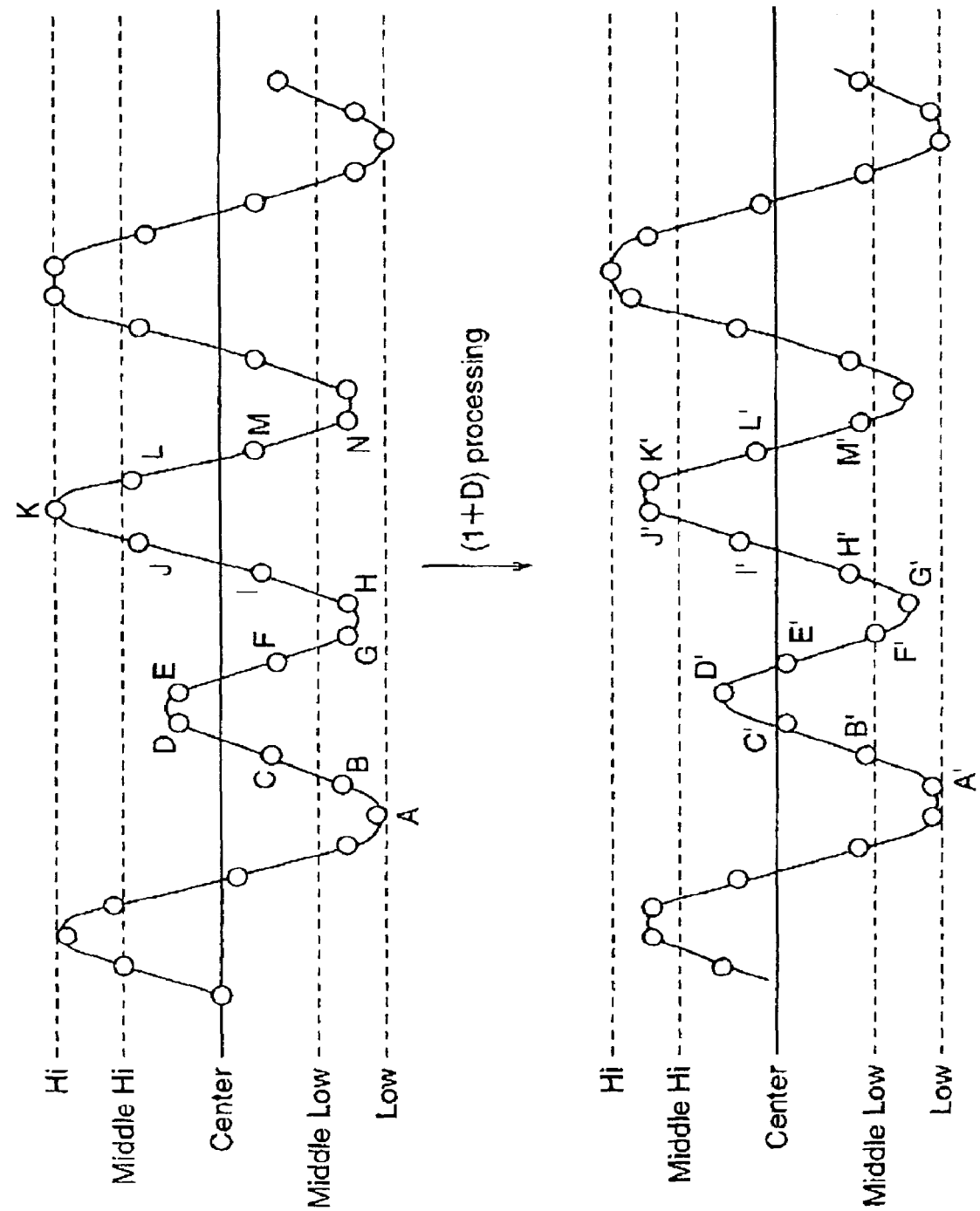
FIG. 10 is a diagram for explaining an operation of a first correcting means according to the first embodiment.

When obtaining an equalization target value of the sampling point D in a case where a signal having a wave form of a large asymmetry as shown in FIG. 10 is inputted to the first correcting means 902, the signs of intermediate values B' to E' which are obtained from the sampling points B~F are negative for B', C', E' while being positive for D', whereby the equalization target value selection signal becomes "1" and thus the equalization target value of "Middle Low" is selected. In this case, the sign of the input signal and the sign of the equalization target value are different from each other, whereby the equalization error becomes abnormally large.

As described above, while the equalization target value of the sampling point D is correctly judged as "Middle Hi" in FIG. 6 when a waveform including no asymmetry is inputted to the apparatus, the equalization target value is erroneously judged when a waveform including a large asymmetry is inputted thereto, whereby the equalization error becomes large. In this case, the erroneous judgment of the equalization target value frequently occurs, and abnormal equalization errors are outputted several times, whereby the adaptive equalization control becomes unstable.

Thus, when the sign of the input signal and the sign of the equalization target value are different from each other, the equalization target value is compulsorily set at "Center" using the first correcting means. That is, when the sign comparing circuit 903 judges that the sign of the input signal from the filter 107 and the sign of the equalization target value outputted from the provisional judgment means 401 are different from each other, the selector 904 selects "Center" that is set in the equalization target value selection circuit 510 of the provisional judgment means 401 and outputs "Center" to the subtractor 905. On the other hand, when the sign comparing circuit 903 judges that the sign of the input signal from the filter 107 and the sign of the equalization target value outputted from the provisional judgment means 401 are the same, the selector 904 selects the equalization target value outputted from the provisional judgment means 401 and outputs the same to the subtractor 905. Then, the subtractor 905 obtains an equalization error on the basis of the input signal from the filter 107 and the output signal from the selector 904. Therefore, it is possible to correct the equalization error when a waveform having a large asymmetry is inputted, thereby performing the adaptive equalization control with stability.

Next, the second correcting means will be described with reference to FIGS. 5, 7, 10, 11, and 12. The second correcting means 511 as shown in FIG. 5 generates a new equalization target value selection signal using the input signal from the adder 505 and the equalization target value selection signal from the adder 508, and inputs the generated signal to the equalization target value selection circuit 510. Further, the second correcting means 712 as shown in FIG. 7 generates a new equalization target value selection signal using the input signal from the filter 107 and the equalization target value selection signal from the adder 709, and inputs the generated signal to the equalization target value selection circuit 510. The operation of the correction means switching means will be described in the second embodiment.

Figure 11:
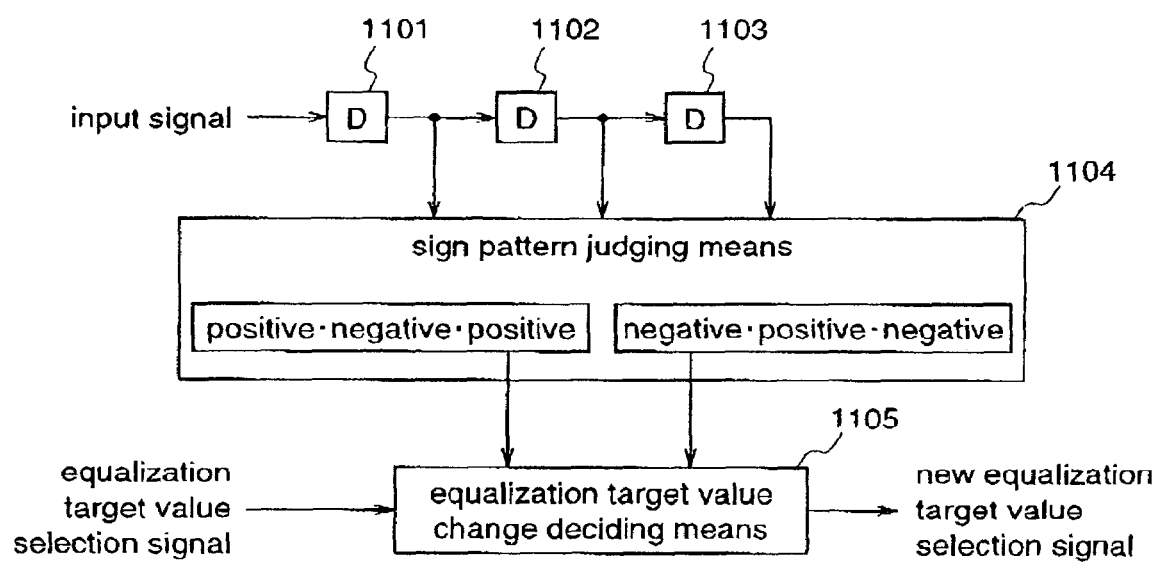
FIG. 11 is a diagram illustrating a structure of a second correcting means according to the first embodiment.

Initially, the structure of the second correcting means will be described with reference to FIG. 11. The second correcting means as shown in FIG. 11 comprises a delay element 1101 for delaying the input signal from the adder 505 or the filter 107 by one clock, a delay element 1102 for delaying an output from the delay element 1101 by one clock, a delay element 1103 for delaying an output from the delay element 1102 by one clock, a sign pattern judging means 1104 for judging the signs of the respective delayed signals which are obtained by delaying the input signal by one clock, by two clocks, and by three clocks, using the delay elements 1101 to 1103, respectively, and judging whether the pattern of the signs of the 3-clock delayed signal, the 2-clock delayed signal, the 1-clock delayed signal is (positive, negative, positive) or (negative, positive, negative), and an equalization target value change deciding means 1105 for deciding whether the equalization target value selection signal is to be selected or not on the basis of the result of the judgment of the sign pattern judgment means 1104.

The equalization target value change deciding means 1105 selects the equalization target value selection signal as it is when the sign pattern judging means 1104 judges that the sign pattern is (positive, negative, positive) and the equalization target value selection signal obtained from the adder 508 or the adder 709 has a value for selecting "Low" of the equalization target value in the equalization target value selection circuit 510, while otherwise compulsorily changing the equalization target value to "Middle Low" to output the same as a new equalization target value selection signal. On the other hand, when the sign pattern judging means 1104 judges that the sign pattern is (negative, positive, negative) and the equalization target value selection signal obtained by the adder 508 or the adder 709 has a value for selecting "Hi" of the equalization target value in the equalization target value selection circuit 510, the equalization target value change deciding means 1105 selects the equalization target value selection signal as it is, while otherwise compulsorily changing the equalization target value to "Middle Hi" to output the same as a new equalization target value selection signal. Further, when the sign pattern judging means 1104 judges that the sign pattern is neither (positive, negative, positive) nor (negative, positive, negative), the equalization target value change deciding means 1105 outputs the inputted equalization target value selection signal as it is.

For example, when the signal having a waveform of a large asymmetry as shown in FIG. 10 is inputted at the channel rate, the provisional judgment for the channel rate mode as shown in FIG. 5 operates. When obtaining the equalization target value of the sampling point E, since the signs of intermediate values C'~F' that are obtained by subjecting sampling points C~G to the (1+D) processing are negative for C', E', F' while being positive for D', the equalization target value selection signal becomes "1" and then the equalization target value is judged as "Middle Low".

That is, although the sign of the sampling point E of the input signal from the filter 107 is positive, the equalization target value that is obtained by the provisional judgment means for the channel rate mode is erroneously judged as "Middle Low", whereby the equalization error becomes abnormally large. In order to avoid the occurrence of such abnormal equalization error, the equalization target value is set at "Middle Hi" when the signs of three successive sampling points of the signal that is outputted from the adder 505 are judged as (negative, positive, negative), while the equalization target value is set at "Middle Low" when the signs of three successive sampling points of the signal that is outputted from the adder 505 are judged as (positive, negative, positive). Thereby, it is possible to correct the equalization error even when the provisional judgment means for the channel rate mode has made an erroneous judgment, thereby avoiding occurrence of abnormally large equalization errors and enabling the adaptive equalization control to be performed with stability.

Figure 12:
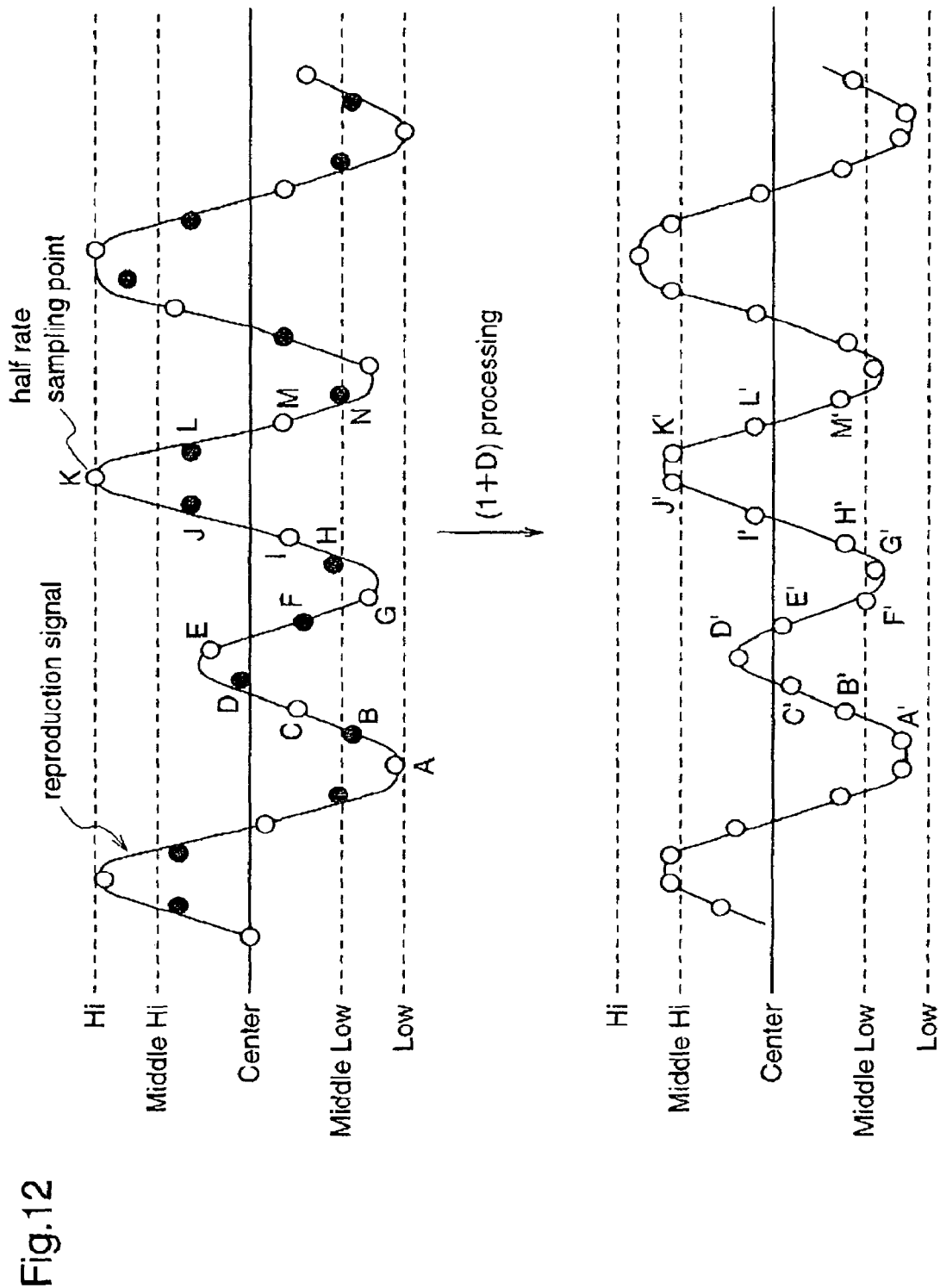
FIG. 12 is a diagram for explaining an operation of the second correcting means according to the first embodiment.

When a waveform including a large asymmetry as shown in FIG. 12 is inputted at the half rate, the provisional judgment means for the half rate mode as shown in FIG. 7 operates. Sampling points of the inputted signal are points ○ such as A, C, E. When the signs of three successive sampling points, for example, C, E, G, are judged, the judged signs are (negative, positive, negative). Further, when obtaining the equalization target value of the sampling point E, sampling points ● such as B, D, F are obtained by subjecting the sampling points ○ to the (1+D) processing, and intermediate values C'~F' are obtained by further subjecting the sampling points C~G to the (1+D) processing. As the signs of the intermediate values C', E', F' are negative and the sign of the intermediate value D' is positive, the equalization target value selection signal becomes "1", and thus the equalization target value is judged as "Middle Low".

More specifically, although the sign of the sampling point E of the input signal from the filter 107 is positive, the provisional judgment means for the half rate mode erroneously judges the equalization target value as "Middle Low", whereby the equalization error becomes abnormally large. In order to avoid such abnormal equalization error, the equalization target value is set at "Middle Hi" when the signs of three successive sampling points of the signal outputted from the filter 107 are judged as (negative, positive, negative).

Further, when obtaining the equalization target value of the sampling point K in FIG. 12, the signs of three successive sampling points I, K, M are judged as (negative, positive, negative), but as the signs of intermediate values I'~L' that are obtained from sampling points I~M including sampling points (●) J and L which are obtained by performing the (1+D) processing are all positive, the equalization target value selection signal becomes "4", and thus the equalization target value of "Hi" is selected. As described above, there are cases where the equalization target value may become "Hi" when the three successive sampling points are judged as (negative, positive, negative), and in these cases there is no need to set the equalization target value at "Middle Hi" because the provisional judgment means for the half rate mode makes a proper judgment. That is, when the signs of three successive sampling points are judged as (negative, positive, negative), the equalization target value is set at "Middle Hi" except when the equalization target value is judged as "Hi" by the provisional judgment means for the half rate mode.

Similarly, when the signs of three successive sampling points are judges as (positive, negative, positive), the equalization target value is set at "Middle Low" except when the provisional judgment means for the half rate mode judges the equalization target value as "Low". Thus, even when the provisional judgment means for the half rate mode makes an erroneous judgment, it is possible to correct the equalization error, and consequently avoid occurrence of an abnormally large equalization error, thereby performing an adaptive equalization control with stability.

Next, the third correcting means will be described with reference to FIGS. 9 and 13. The third correcting means as shown in FIG. 9 comprises a delay element 908 for delaying the equalization target value selection signal that is outputted from the provisional judgment means 401 by one clock, an equalization target value judging means 909 for judging whether the equalization target value is successively set at "Hi" or "Low" using the equalization target value selection signal and the equalization target value selection signal delayed by one clock by the delay element 908, and a selector 910 which judges that the input signal is a long mark when the equalization target value judging means 909 judges the equalization target value successively as "Hi" or "Low" and selects the equalization target value so as to compulsorily make the equalization error zero, while otherwise selecting the output from the selector 906.

The operation of the equalization error detecting means 402 in a case where a reproduction signal having a waveform distortion in a long mark is inputted will be described with reference to FIG. 13. A diagram showing a waveform of the reproduction signal in the channel rate mode when it is normally recorded is shown in the upper half of FIG. 13. In this figure, sampling points A to O correspond to a long mark. When such reproduction signal is inputted, also the provisional judgment means properly judges the equalization target value, whereby the equalization error does not become large, resulting in a stable adaptive equalization control.

Figure 13:
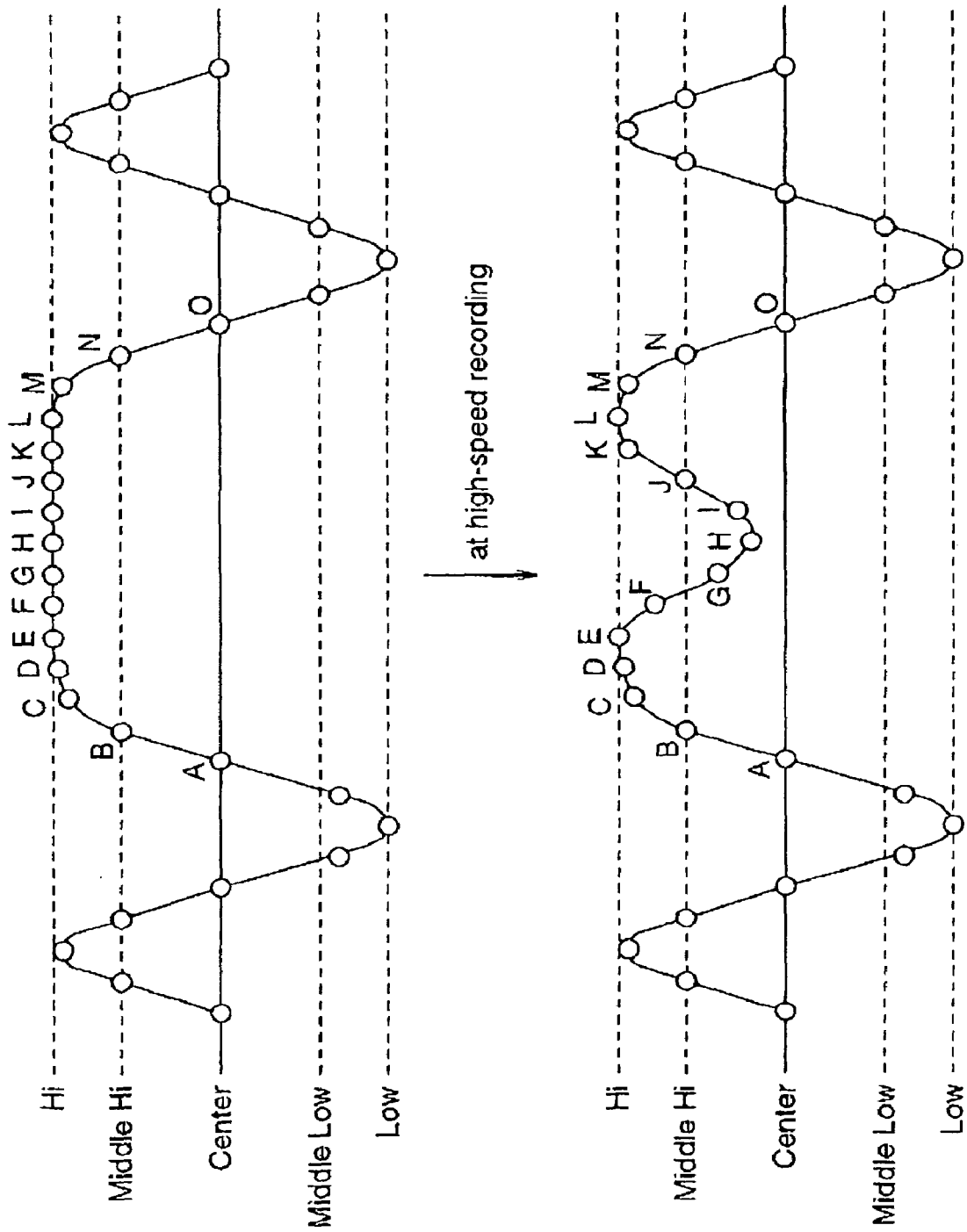
FIG. 13 is a diagram for explaining an operation of a third correcting means according to the first embodiment.

However, when a disc in which a pit shape defect occurs at the high-speed recording is played, the waveform of the long mark part is concave in the center part as shown in the lower half of FIG. 13. As the provisional judgment means judges the equalization target values of the sampling points C to M as "Hi" in this case, equalization errors with respect to the sampling points G to I having a concave waveform become abnormally large.

Then, the equalization target value judging means 909 judges that the input signal is a long mark when the equalization target value selection signal that is outputted from the provisional judgment means 401 is "4, 4" that judges the equalization target values of the two successive sampling points as "Hi, Hi" or the equalization target value selection signal is "0, 0" that judges the equalization target values of the two successive sampling points as "Low, Low", and then corrects the equalization target value so that the equalization error of a section that is judged as a long mark is compulsorily made zero. This pit shape defect occurs only on one side where the equalization target value is "Hi" or "Low", but this processing can address both sides because if it addresses only one side, it is impossible to perform correction in some cases where the input signal is inverted or the like.

As described above, the third correcting means can perform the adaptive equalization control with stability even when the reproduction signal having a distortion in the long mark due to a pit shape defect that occurs at the high-speed recording is inputted, without outputting an abnormally large equalization error. Further, also in the half rate mode, it is possible to similarly perform the correction, resulting in a stable adaptive equalization control.

In this case, two successive sampling points are judged by the equalization target value judging means, while the number of successive sampling points is not limited to two and may be three or more.

The reproduction signal processing apparatus according to this first embodiment includes the reproduction means 102 for reproducing information that is recorded on the optical disc 101; the A/D converter 103 for converting the reproduction signal that is reproduced by the reproduction means 102 into a multi-bit digital signal; the phase-locked loop control means 104 for outputting a reproduction clock using the multi-bit digital signal; the filter 107 for performing digital equalization to the multi-bit digital signal that is obtained by the A/D converter 103; and the filter coefficient learning means 108 for adaptively controlling the filter coefficients of the filter 107 in accordance with the digitally equalized signal so as to minimize the equalization error, and the filter coefficient learning means 108 includes the equalization error correcting means 109 for correcting the equalization error when the reproduction signal of a deteriorated quality is to be equalized. Therefore, this reproduction signal processing apparatus can perform the adaptive equalization control with stability not only in the channel rate mode but also in the half rate mode that is instructed to suppress the power consumption, also when the reproduction signal of a waveform including a large asymmetry or a distortion due to a pit shape defect that occurs at the high-speed recording is inputted to the apparatus.

Embodiment 2

A reproduction signal processing apparatus according to a second embodiment of the present invention will be described with reference to FIGS. 4, 7, 9 and 14.

Figure 14:
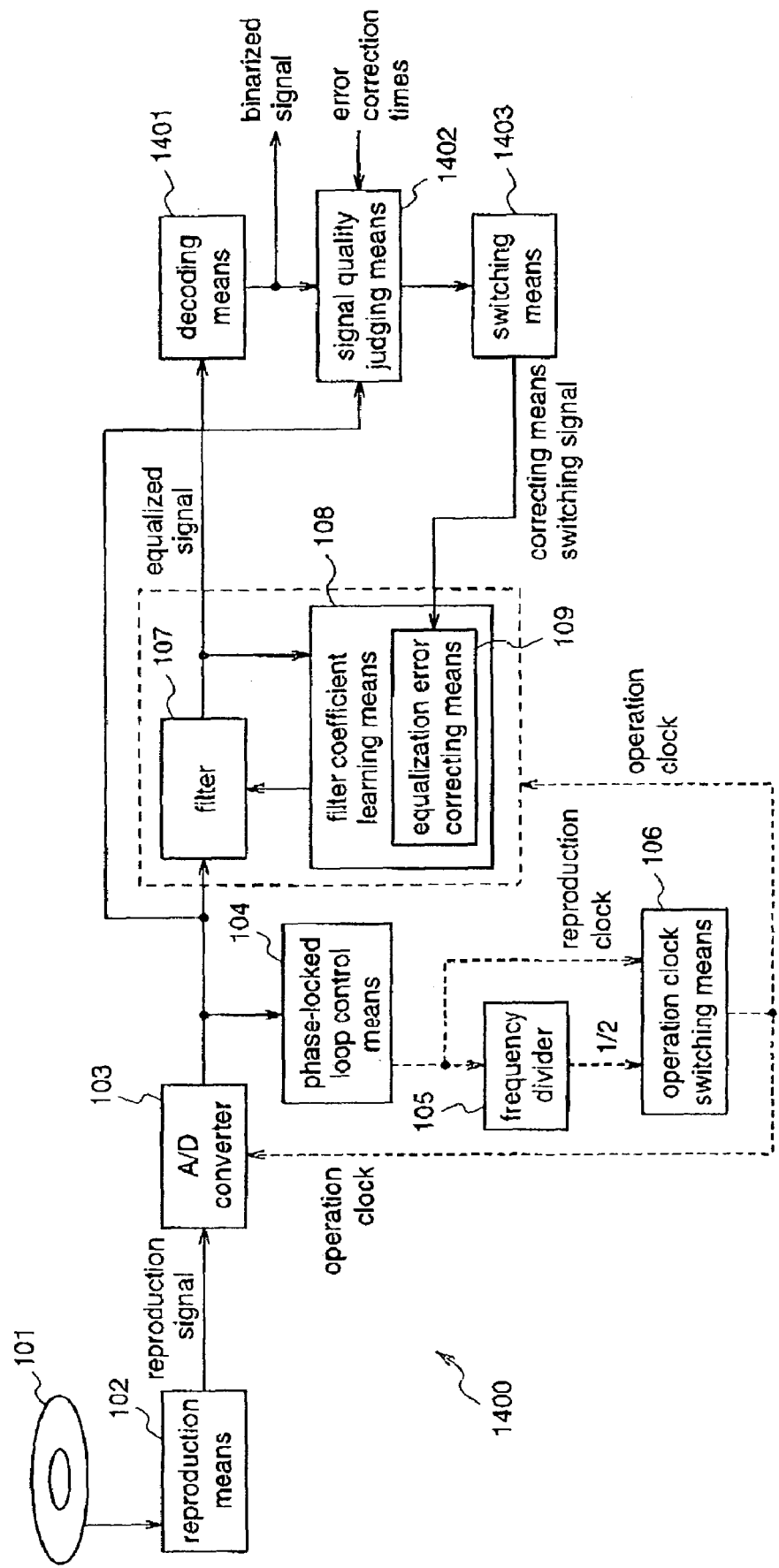
FIG. 14 is a block diagram illustrating a structure of a reproduction signal processing apparatus according to a second embodiment of the present invention.

FIG. 14 is a block diagram illustrating a structure of a reproduction signal processing apparatus 1400 according to the second embodiment. The difference of the second embodiment from the first embodiment is that the apparatus 1400 includes a decoding means 1401 for decoding an equalized signal that is outputted from the filter 107, a signal quality judging means 1402 for judging the signal quality of the decoded signal that is outputted from the decoding means 1401, and a switching means 1403 for changing the value of a correcting means switching signal in accordance with the result of the judgment of the signal quality judging means 1402. The same members and structures as those in the first embodiment are denoted by the same reference numerals.

The decoding means 1401 comprises for example a Viterbi decoder using a maximum likelihood decoding method or the like, and decodes a multi-bit equalized signal as an input signal and outputs a decoded binary signal.

The signal quality judging means 1402 comprises for example a signal amplitude detecting means, a synchronization pattern detector, an error correction times comparing means, and the like. The signal quality judging means evaluates the quality of the reproduction signal when the synchronization pattern cannot normally be detected, when the number of times of the error correction is large, or the like. With the above structure, it is possible to selectively use three correction means not only to a reproduction signal including an asymmetry but also to a reproduction signal that is obtained by playing an optical disc having flaws or dusts on the surface.

Here, judgment conditions of the signal quality judging means 1402 are described in more detail.

In accordance with the first judgment condition, the amplitude of the input signal from the A/D converter 103 is compared with a predetermined threshold, and when a state where the amplitude of the input signal is smaller than the threshold value continues for a prescribed period, it is judged that the quality of the reproduction signal is deteriorated. Thereby, it is possible to detect that a dropout has occurred in the reproduction signal.

In accordance with the second judgment condition, the amplitude maximum value on the positive end of the input signal from the A/D converter 103 and the amplitude maximum value on the negative end are compared with each other, and when a difference in the amplitude maximum value between the positive and negative ends is larger than a predetermined value as a result of the comparison, it is judged that the quality of the reproduction signal is deteriorated. Thereby, it is possible to detect that an asymmetry has occurred in the reproduction signal.

In accordance with the third judgment condition, a synchronization pattern that is included at regular intervals in the information recorded on the optical disc 101 is detected from the signal outputted from the filter 107, and when the synchronization pattern cannot be detected at the regular intervals, it is judged that the quality of the reproduction signal is deteriorated. Thereby, it is possible to detect that the synchronization pattern is not included in the reproduction signal.

In accordance with the fourth judgment condition, a synchronization pattern that is included at regular intervals in the information recorded on the optical disc 101 is detected from a signal outputted from the decoding means 1401 (data that is obtained by binarizing the output signal from the filter 107), and when the synchronization pattern is not detected at the regular intervals, it is judged that the quality of the reproduction signal is deteriorated. Thereby, it is possible to detect that the synchronization pattern is not included in the reproduction signal.

In accordance with the fifth judgment condition, when an error exists in the output data from the decoding means 1401, the number of times of error correction that is performed using an error correction code which is attached to the information recorded on the optical disc 101 is inputted, this number of times of the error correction is compared with a predetermined value, and it is judged that the quality of the reproduction signal is deteriorated when this number of times of the error correction is larger than the predetermined value. Thereby, it is possible to detect that the reproduction signal is a signal in which the error correction has occurred many times.

The switching means 1403 changes the value of the correcting means switching signal when the signal quality judging means 1402 judges that the quality of the reproduction signal is deteriorated, thereby switching whether the correction means is to be used or not.

The correcting means switching signal is for switching whether the correction means is to be used or not, as for the first correcting means, the second correcting means, and the third correcting means, respectively, as shown in FIG. 4. The method for switching the correction means will be described with reference to FIGS. 7 and 9.

In FIG. 9, whether the first correcting means 902 is to be used or not is selected by the selector 906, and when the first correcting means is not used, the output from the subtractor 901 is selected. Further, in the channel rate mode, whether the second correcting means 511 in FIG. 5 is to be used or not is selected by the selector 512, and when the second correcting means 511 is not used, the output from the adder 508 is inputted as it is to the equalization target value selection circuit 510. In the half rate mode, whether the second correcting means 712 in FIG. 7 is to be used or not is selected by the selector 713, and the output from the adder 709 is inputted as it is to the equalization target value selection circuit 510 when the second correcting means is not used. Further, in FIG. 9, whether the third correcting means 907 is to be used or not is selected by the selector 911, and the output from the selector 906 is outputted as an equalization error when the third correcting means is not used.

In this case, the correcting means switching signal is a 3-bit signal that is changed by a register or the like, and the highest-order bit indicates switching of the first correcting means, the middle-order bit indicates switching of the second correcting means, and the lowest-order bit indicates switching of the third correcting means. For example, assuming that the each bit indicates that the correction means is not used when it is "0" while indicating that the correction means is to be used when it is "1", none of the correction means is used when the correcting means switching signal is "000", and the second and third correcting means are used when the correcting means switching signal is "011". It is also possible to previously set values of the correcting means switching signal individually for the channel rate mode and the half rate mode.

It is also possible to assign priorities to the values of the correcting means switching signal that is changed when the signal quality judging means judges that the quality of the reproduction signal is low. For example, the initial value of the correcting means switching signal is set at a value indicating that all of the correction means are not used, then when the quality of the reproduction signal is low in this situation, the signal is changed to a value indicating that only the first correcting means is used, and when the quality of the reproduction signal is judged lower in this situation, the signal is changed to a value indicating that the first and third correcting means are used. When the priorities are assigned to the combinations of the correction means to be used in this manner, it is possible to automatically change the value of the correction means switching means.

Therefore, when data of the initial value of the correcting means switching signal and the values which are to be changed from the initial value according to the priorities are retained in the channel rate mode and the half rate mode, respectively, it is possible to automatically change the correcting means switching signal in either mode. In another example, since no abnormal equalization error is outputted when a disc that includes almost no asymmetry and does not have a pit shape defect caused at the high-speed recording is played back, it is possible to obtain a decoded signal of a satisfactory quality even when the correcting means switching signal is set at a value indicating that no correction means is to be used, but when other discs are played and it is judged that the quality of the reproduction signal is low, the value of the correcting means switching signal will be changed to use the correction means. However, since there are a wide variety of factors other than the asymmetry and the pit shape defect as the reason why the signal quality is deteriorated, it is also effective to utilize a method of incorporating changing of the value of the correcting means switching signal while changing parameters of other possible factors, without changing the value of the correcting means switching signal on the highest-priority basis.

The reproduction signal processing apparatus according to the second embodiment includes the reproduction means 102 for reproducing information that is recorded on the optical disc 101, the A/D converter 103 for converting the reproduction signal that is reproduced by the reproduction means 102 into a multi-bit digital signal, the phase-locked loop control means 104 for outputting a reproduction clock using the multi-bit digital signal, the filter 107 for performing digital equalization to the multi-bit digital signal that is obtained by the A/D converter 103, the filter coefficient learning means 108 for adaptively controlling filter coefficients of the filter 107 in accordance with the digitally equalized signal so as to minimize the equalization error, and the signal quality judging means 1402 for judging the signal quality of the reproduction signal, and the filter coefficient learning means 108 includes an equalization error correcting means 109 for correcting the equalization error when the reproduction signal of a deteriorated quality is to be equalized, and the switching means 1403 for changing the value of the correcting means switching signal for switching plural correction means included in the equalization error correcting means 109 on the basis of the result of the judgment of the signal quality judging means 1402. Therefore, it is possible to judge the quality of the reproduction signal according to the number of times of the error correction, the synchronization signal pattern detection or the like, thereby adaptively correcting the equalization error on the basis of the result of the judgment.

Figure 15:
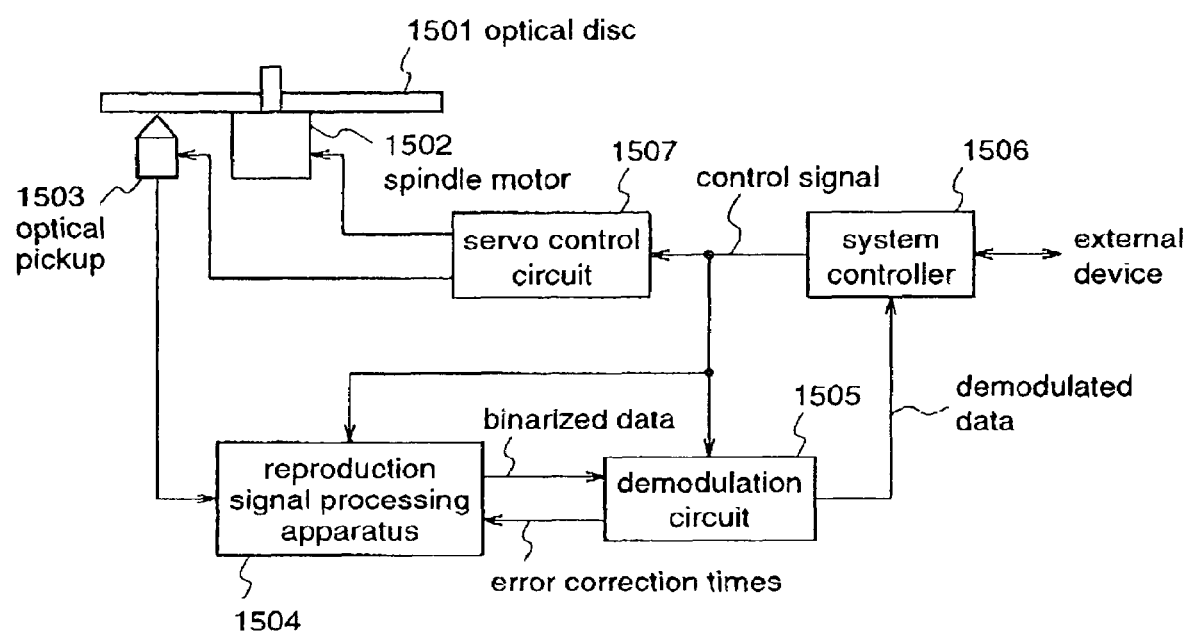
FIG. 15 is a diagram illustrating a structure of an optical disc playback apparatus including the reproduction signal processing apparatus according to the second embodiment.

The reproduction signal processing apparatus according to the second embodiment is applicable as a disk drive, which is specifically shown in FIG. 15.

An optical disc player as shown in FIG. 15 includes a spindle motor 1502 for rotating an optical disc 1501, an optical pickup 1503 for reading a reproduction signal from the optical disc 1501, a reproduction signal processing apparatus 1504 corresponding to the second embodiment, a demodulation circuit 1505 for demodulating binary data that are outputted from the reproduction signal processing apparatus 1504, performing error correction to extract data that are recorded on the optical disc, and outputting the extracted data as demodulated data, a system controller 1506 for communicating with or giving/receiving data to/from an external device as well as controlling the respective components, and a servo control circuit 1507 for controlling the spindle motor 1502 and the optical pickup 1503. Since this optical disc player is provided with the reproduction signal processing apparatus 1504 corresponding to the second embodiment, it is possible to perform a satisfactory adaptive equalization control to a reproduction waveform having not only an asymmetry but also a distortion that occurs in playing back an optical disc having flaws or dusts on the surface or an optical disc including a pit shape defect, thereby always obtaining a satisfactory quality of the reproduction signal.

In the first and second embodiments, one of the reproduction clock and a clock that is obtained by performing the frequency division using the frequency divider is employed as the operation clock, while it is possible to use only the reproduction clock as the operation clock without providing the frequency divider 105 and the operation clock switching means 106. This is also applicable to the optical disc player.

As described above, the reproduction signal processing apparatus according to the present invention is useful as a reproduction signal processing apparatus that can perform an adaptive equalization control with stability not only in the channel rate mode but also in the half rate mode that is introduced to suppress power consumption, even when a reproduction signal of a waveform having a large asymmetry or a distortion due to a pit shape defect that is caused at the high-speed recording is inputted to the apparatus.

What is claimed is:

1. A reproduction signal processing apparatus comprising:
   a reproduction unit for reproducing information that is recorded on an optical disc;
   an A/D converter for converting a reproduction signal that is reproduced by the reproduction unit into a multi-bit digital signal;
   a phase-locked loop control unit for outputting a reproduction clock that is in phase with clock components included in the reproduction signal, using the multi-bit digital signal;
   a filter for performing digital equalization to the multi-bit digital signal that is obtained by the A/D converter; and
   a filter coefficient learning unit for adaptively controlling filter coefficients of the filter in accordance with the digitally equalized signal to minimize an equalization error, wherein said filter coefficient learning unit includes:
an equalization error correcting unit for correcting the equalization error when the reproduction signal of a deteriorated quality is to be equalized;
a provisional judgment unit for setting an equalization target value using an output signal from the filter;
an equalization error detection unit for detecting an equalization error using the equalization target value that is set by the provisional judgment unit and the output signal from the filter; and
a filter coefficient operating unit for updating the filter coefficients using the equalization error that is detected by the equalization error detection unit and the multi-bit digital signal that is obtained by the A/D converter;
said equalization error correcting unit including a correcting unit for performing correction when a sign of the equalization target value that is set by the provisional judgment unit and a sign of the output signal from the filter are different from each other.

2. A reproduction signal processing apparatus as comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal, using the multi-bit digital signal;
a filter for performing digital equalization to the multi-bit digital signal that is obtained by the A/D converter; and
a filter coefficient learning unit for adaptively controlling filter coefficients of the filter in accordance with the digitally equalized signal to minimize an equalization error,
wherein said filter coefficient learning unit includes:
an equalization error correcting unit for correcting the equalization error when the reproduction signal of a deteriorated quality is to be equalized;
a provisional judgment unit for setting an equalization target value using an output signal from the filter;
an equalization error detection unit for detecting an equalization error using the equalization target value that is set by the provisional judgment unit and the output signal from the filter; and
a filter coefficient operating unit for updating the filter coefficients using the equalization error that is detected by the equalization error detection unit and the multi-bit digital signal that is obtained by the A/D converter;
said provisional judgment unit including an adder for adding two successive output signals from the filter; and
said equalization error correcting unit including a correcting unit for performing correction when a pattern of signs of three successive output signals from the adder is (positive, negative, positive) or (negative, positive, negative).

3. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal, using the multi-bit digital signal;
a filter for performing digital equalization to the multi-bit digital signal that is obtained by the A/D converter; and
a filter coefficient learning unit for adaptively controlling filter coefficients of the filter in accordance with the digitally equalized signal to minimize an equalization error,
wherein said filter coefficient learning unit includes:
an equalization error correcting unit for correcting the equalization error when the reproduction signal of a deteriorated quality is to be equalized;
a provisional judgment unit for setting an equalization target value using an output signal from the filter;
an equalization error detection unit for detecting an equalization error using the equalization target value that is set by the provisional judgment unit and the output signal from the filter; and
a filter coefficient operating unit for updating the filter coefficients using the equalization error that is detected by the equalization error detection unit and the multi-bit digital signal that is obtained by the A/D converter;
said equalization error correcting unit including a correcting unit for performing correction when the equalization target value is set by the provisional judgment unit at a highest level among plural equalization target values successively by a predetermined number of times or at a lowest level among the plural equalization target values successively by a predetermined number of times.

4. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal, using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a frequency divider for frequency-dividing the reproduction clock to generate a second reproduction clock;
an operation clock switching unit for selecting one of the reproduction clock and the second reproduction clock as an operation clock;
wherein said A/D converter is operable to sample the reproduction signal in a cycle of the operation clock; and said A/D converter, said phase-locked loop control unit, said filter, and said filter coefficient learning unit operate in accordance with the operation clock;
said filter coefficient learning unit including:
an equalization error correcting unit for correcting the equalization error when the reproduction signal of a deteriorated quality is to be equalized;
a provisional judgment unit for setting an equalization target value using an output signal from the filter;
an equalization error detection unit for detecting an equalization error using the equalization target value that is set by the provisional judgment unit and the output signal from the filter; and a filter coefficient operating unit for updating the filter coefficients using the equalization error that is detected by the equalization error detection unit and the multi-bit digital signal that is obtained by the A/D converter; and said provisional judgment unit including:

a first provisional judgment unit for setting the equalization target value using the reproduction clock;

a second provisional judgment unit for setting the equalization target value using the second reproduction clock; and a provisional judgment selection unit for selecting one of the first provisional judgment unit and the second provisional judgment unit on the basis of the result of the selection by the operation clock switching unit.

5. The reproduction signal processing apparatus as defined in claim 4 wherein the equalization error correcting unit includes:

a first correcting unit for performing correction when a sign of the equalization target value that is set by the provisional judgment unit and a sign of the output signal from the filter are different from each other.

6. The reproduction signal processing apparatus as defined in claim 5 wherein when the sign of the equalization target value that is set by the provisional judgment unit and the sign of the output signal from the filter are different from each other, the first correcting unit sets the equalization target value at a center level among plural equalization target values which are set by the provisional judgment unit.

7. The reproduction signal processing apparatus as defined in claim 4 wherein the first provisional judgment unit includes an adder for adding two successive output signals from the filter, and the equalization error correcting unit includes a correcting unit for performing correction when a pattern of signs of three successive output signals from the adder is (positive, negative, positive) or (negative, positive, negative) in cases where the first provisional judgment unit is selected in the provisional judgment unit.

8. The reproduction signal processing apparatus as defined in claim 7 wherein the correcting unit of the equalization error correcting unit includes:

a sign pattern judging unit for judging whether or not the sign pattern of three successive output signals from the adder is (positive, negative, positive) or (negative, positive, negative).

9. The reproduction signal processing apparatus as defined in claim 8 wherein the correcting unit changes the equalization target value that is set by the provisional judgment unit to a new value when the sign pattern judging unit judges that the sign pattern of three successive output signals from the adder is (positive, negative, positive) or (negative, positive, negative).

10. The reproduction signal processing apparatus as defined in claim 9 wherein the correcting unit sets the equalization target value at a first equalization target value which is an intermediate level between a lowest level and a center level in cases where the sign pattern judging unit judges that the sign pattern of three successive output signals from the adder is (positive, negative, positive), except when the equalization target value that is set by the provisional judging unit is at a lowest level among plural equalization target values.

11. The reproduction signal processing apparatus as defined in claim 9 wherein the correcting unit sets the equalization target value at a second equalization target value which is an intermediate level between a highest level and a center level in cases where the sign pattern judging unit judges that the sign pattern of three successive output signals from the adder is (negative, positive, negative), except when the equalization target value that is set by the provisional judgment unit is at a highest level among plural equalization target values.

12. The reproduction signal processing apparatus as defined in claim 4 wherein the equalization error correcting unit includes a correcting unit for performing correction when a pattern of signs of three successive output signals from the filter is (positive, negative, positive) or (negative, positive, negative) in cases where the second provisional judgment unit is selected in the provisional judgment unit.

13. The reproduction signal processing apparatus as defined in claim 12 wherein the correcting unit of the equalization error correcting unit includes:

a sign pattern judging unit for judging whether or not the sign pattern of three successive output signals from the filter is (positive, negative, positive) or (negative, positive, negative).

14. The reproduction signal processing apparatus as defined in claim 13 wherein the correcting unit changes the equalization target value that is set by the provisional judgment unit to a new value when the sign pattern judging unit judges that the sign pattern of three successive output signals from the filter is (positive, negative, positive) or (negative, positive, negative).

15. The reproduction signal processing apparatus as defined in claim 14 wherein the correcting unit sets the equalization target value at a first equalization target value which is an intermediate level between a lowest level and a center level in cases where the sign pattern judging unit judges that the sign pattern of three successive output signals from the filter is (positive, negative, positive), except when the equalization target value that is set by the provisional judgment unit is at a lowest level among plural equalization target values.

16. The reproduction signal processing apparatus as defined in claim 14 wherein the correcting unit sets the equalization target value at a second equalization target value which is an intermediate level between a highest level and a center level in cases where the sign pattern judging unit judges that the sign pattern of three successive output signals from the filter is (negative, positive, negative), except when the equalization target value that is set by the provisional judgment unit is at a highest level among the plural equalization target values.

17. The reproduction signal processing apparatus as defined in claim 4 wherein the equalization error correcting unit includes:

a correcting unit for performing correction when the equalization target value is set by the provisional judgment unit at a highest level among the plural equalization target values successively by a predetermined number of times, or at a lowest level among the plural equalization target values successively by a predetermined number of times.

18. The reproduction signal processing apparatus as defined in claim 17 wherein
the correcting unit of the equalization error correcting unit includes:
an equalization target value judging unit for judging whether the provisional judgment unit sets the equalization target value successively at the highest level or successively at the lowest level.

19. The reproduction signal processing apparatus as defined in claim 18 wherein
the correcting unit compulsorily makes zero the equalization error that is outputted from the equalization error detection unit when the equalization target value judging unit judges that the provisional judgment unit sets the equalization target value successively at the highest level or successively at the lowest level.

20. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal;
a switching unit for changing a value of a correcting unit switching signal on the basis of a result of the judgment of the signal quality judging unit;
wherein said filter coefficient learning unit includes:
plural equalization error correcting units for correcting the equalization error when the reproduction signal of a deteriorated quality is to be equalized;
a provisional judgment unit for setting an equalization target value using an output signal from the filter;
an equalization error detection unit for detecting an equalization error using the equalization target value that is set by the provisional judgment unit and the output signal from the filter; and
a filter coefficient operating unit for updating the filter coefficients using the equalization error that is detected by the equalization error detection unit and the multi-bit digital signal that is obtained by the A/D converter, and switching the plural equalization error correcting units according to the value of the correcting unit switching signal;
said provisional judgment unit including an adder for adding two successive output signals from the filter; and
said equalization error correcting unit including:
a first correcting unit for performing correction when a sign of the equalization target value that is set by the provisional judgment unit and a sign of the output signal from the filter are different from each other;
a second correcting unit for performing correction when a pattern of signs of three successive output signals from the adder is (positive, negative, positive), or (negative, positive, negative); and
a third correcting unit for performing correction when the equalization target value is set by the provisional judgment unit at a highest level among plural equalization target values successively by a predetermined number of times or at a lowest level among the plural equalization target values successively by a predetermined number of times.

21. A reproduction signal processing apparatus comprising:
a reproduction unit for reproducing information that is recorded on an optical disc; an A/D converter for converting a reproduction signal that is reproduced by the reproduction unit into a multi-bit digital signal;
a phase-locked loop control unit for outputting a reproduction clock that is in phase with clock components included in the reproduction signal, using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal;
a switching unit for changing a value of a correcting unit switching signal on the basis of a result of the judgment of the signal quality judging unit;
a frequency divider for frequency-dividing the reproduction clock to generate a second reproduction clock;
an operation clock switching unit for selecting one of the reproduction clock and the second reproduction clock as an operation clock;
wherein said A/D converter is operable to sample the reproduction signal in a cycle of the operation clock; and said A/D converter, said phase-locked loop control unit, said filter and said filter coefficient learning unit operate in accordance with the operation clock;
said filter coefficient learning unit including:
plural equalization error correcting units for correcting the equalization error when the reproduction signal of a deteriorated quality is to be equalized, and switching the plural equalization error correcting units according to the value of the correcting unit switching signal
a provisional judgment unit for setting an equalization target value using the output signal from the filter;
an equalization error detection unit for detecting an equalization error using the equalization target value that is set by the provisional judgment unit and the output signal from the filter; and
a filter coefficient operating unit for updating the filter coefficients using the equalization error that is detected by the equalization error detection unit and the multi-bit digital signal that is obtained by the A/D converter; and
said provisional judgment unit including:
a first provisional judgment unit for setting the equalization target value using the reproduction clock;
a second provisional judgment unit for setting the equalization target value using the second reproduction clock; and a provisional judgment selection unit for selecting one of the first provisional judgment unit and the second provisional judgment unit on the basis of the result of the selection by the operation clock switching unit.

22. The reproduction signal processing apparatus as defined in claim 21 wherein the first provisional judgment unit includes an adder for adding two successive output signals from the filter, and the equalization error correcting unit includes:

a first correcting unit for performing correction when a sign of the equalization target value that is set by the provisional judgment unit and a sign of the output signal from the filter are different from each other;

a second correcting unit for performing correction when a pattern of signs of three successive output signals from the adder is (positive, negative, positive) or (negative, positive, negative) in cases where the first provisional judgment unit is selected in the provisional judgment unit or when a pattern of signs of three output signals from the filter is (positive, negative, positive) or (negative, positive, negative) in cases where the second provisional judgment unit is selected in the provisional judgment unit; and a third correcting unit for performing correction when the equalization target value is set by the provisional judgment unit at a highest level among plural equalization target values successively by a predetermined number of times or at a lowest level among the plural equalization target value successively by a predetermined number of times.

23. The reproduction signal processing apparatus as defined in claim 22 wherein when the sign of the equalization target value that is set by the provisional judgment unit and the sign of the output signal from the filter are different from each other, the first correcting unit sets the equalization target value at a center level among plural equalization target values which are set by the provisional judgment unit.

24. The reproduction signal processing apparatus as defined in claim 22 wherein the second correcting unit includes a sign pattern judging unit for judging whether or not the sign pattern of three successive output signals from the adder is (positive, negative, positive) or (negative, positive, negative) in cases where the first provisional judgment unit is selected in the provisional judgment unit.

25. The reproduction signal processing apparatus as defined in claim 24 wherein the second correcting unit changes the equalization target value that is set by the provisional judgment unit to a new value when the sign pattern judging unit judges that the sign pattern of three successive output signals from the adder is (positive, negative, positive) or (negative, positive, negative).

26. The reproduction signal processing apparatus as defined in claim 25 wherein the second correcting unit sets the equalization target value at a first equalization target value which is an intermediate level between a lowest level and a center level in cases where the sign pattern judging unit judges that the sign pattern of three successive output signals from the adder is (positive, negative, positive), except when the equalization target value that is set by the provisional judgment unit is at a lowest level among plural equalization target values.

27. The reproduction signal processing apparatus as defined in claim 25 wherein the second correcting unit sets the equalization target value at a second equalization target value which is an intermediate level between a highest level and a center level in cases where the sign pattern judging unit judges that the sign pattern of three successive output signals from the adder is (negative, positive, negative), except when the equalization target value that is set by the provisional judgment unit is at a highest level among the plural equalization target values.

28. The reproduction signal processing apparatus as defined in claim 22 wherein the second correcting unit includes: a sign pattern judging unit for judging whether or not the sign pattern of three successive output signals from the filter is (positive, negative, positive) or (negative, positive, negative) in cases where the second provisional judgment unit is selected in the provisional judgment unit.

29. The reproduction signal processing apparatus as defined in claim 28 wherein the second correcting unit changes the equalization target value that is set by the provisional judgment unit to a new value when the sign pattern judging unit judges that the sign pattern of three successive output signals from the filter is (positive, negative, positive) or (negative, positive, negative).

30. The reproduction signal processing apparatus as defined in claim 29 wherein the second correcting unit sets the equalization target value at a first equalization target value which is an intermediate level between a lowest level and a center level in cases where the sign pattern judging unit judges that the sign pattern of three successive output signals from the filter is (positive, negative, positive), except when the equalization target value that is set by the provisional judgment unit is at a lowest level among the plural equalization target values.

31. The reproduction signal processing apparatus as defined in claim 29 wherein the second correcting unit sets the equalization target value at a second equalization target value which is an intermediate level between a highest level and a center level in cases where the sign pattern judging unit judges that the sign pattern of three successive output signals from the filter is (negative, positive, negative), except when the equalization target value that is set by the provisional judgment unit is at a highest level among the plural equalization target values.

32. The reproduction signal processing apparatus as defined in claim 22 wherein the third correcting unit includes:

an equalization target value judging unit for judging whether the equalization target value is set by the provisional judgment unit successively at the highest level or successively at the lowest level.

33. The reproduction signal processing apparatus as defined in claim 32 wherein the third correcting unit compulsorily makes zero the equalization error that is detected by the equalization error detection unit when the equalization target value judging unit judges that the equalization target value is set by the provisional judgment unit successively at the highest level or successively at the lowest level.

34. The reproduction signal processing apparatus as defined in claim 22 wherein
the switching unit switches whether or not the first correcting unit, the second correcting unit, and the third correcting unit are to be used, respectively, in accordance with the correcting unit switching signal.

35. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal; and
a switching unit for changing a value of a correcting unit switching signal on the basis of a result of the judgment of the signal quality judging unit;
wherein said filter coefficient learning unit includes plural equalization error correcting units for correcting the equalization error when the reproduction signal of a deteriorated quality is to be equalized, and switching the plural equalization error correcting units according to the value of the correcting unit switching signal; and
wherein said signal quality judging unit is operable to receive the multi-bit digital signal to compare the amplitude of the multi-bit digital signal and a predetermined threshold with each other, and to judge that the quality of the reproduction signal is deteriorated when a state where the amplitude is lower than the predetermined threshold continues for a prescribed period.

36. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal; and
a switching unit for changing a value of a correcting unit switching signal on the basis of a result of the judgment of the signal quality judging unit;
wherein said filter coefficient learning unit includes plural equalization error correcting units for correcting the equalization error when the reproduction signal of a deteriorated quality is to be equalized, and switching the plural equalization error correcting units according to the value of the correcting unit switching signal; and
wherein said signal quality judging unit is operable to receive the multi-bit digital signal to compare the amplitude maximum values on the positive and negative ends of the multi-bit digital signal with each other, and to judge that the quality of the reproduction signal is deteriorated when a difference between the amplitude maximum value on the positive end and the amplitude minimum value on the negative end is larger than a predetermined value as a result of the comparison.

37. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal; and
a switching unit for changing a value of a correcting unit switching signal on the basis of a result of the judgment of the signal quality judging unit;
wherein said filter coefficient learning unit includes plural equalization error correcting units for correcting the equalization error when the reproduction signal of a deteriorated quality is to be equalized, and switching the plural equalization error correcting units according to the value of the correcting unit switching signal; and
wherein said signal quality judging unit is operable to receive the output signal from the filter to detect a synchronization pattern that is included in the information recorded on the optical disc at prescribed intervals from the output signal of the filter, and to judge that the quality of the reproduction signal is deteriorated when the synchronization pattern cannot be detected at the prescribed intervals.

38. A reproduction signal processing apparatus comprising:
a reproduction unit for reproducing information that is recorded on an optical disc;
an A/D converter for converting a reproduction signal that is reproduced by the reproduction unit into a multi-bit digital signal;
a phase-locked loop control unit for outputting a reproduction clock that is in phase with clock components included in the reproduction signal using the multi-bit digital signal;
a filter for performing digital equalization to the multi-bit digital signal that is obtained by the A/D converter;
a filter coefficient learning unit for adaptively controlling filter coefficients of the filter in accordance with the digitally equalized signal to minimize an equalization error;
a signal quality judging unit for judging a quality of the reproduction signal; and a switching unit for changing a value of a correcting unit switching signal on the basis of a result of the judgment of the signal quality judging unit;

wherein said filter coefficient learning unit includes plural equalization error correcting units for correcting the equalization error when the reproduction signal of a deteriorated quality is to be equalized, and switching the plural equalization error correcting units according to the value of the correcting unit switching signal; and wherein said signal quality judging unit is operable to receive data that is obtained by binarizing the output signal from the filter to detect a synchronization pattern that is included in the information recorded on the optical disc at prescribed intervals from the binarized data, and to judge that the quality of the reproduction signal is deteriorated when the synchronization pattern cannot be detected at the prescribed intervals.

39. A reproduction signal processing apparatus comprising:

a reproduction unit for reproducing information that is recorded on an optical disc;

an A/D converter for converting a reproduction signal that is reproduced by the reproduction unit into a multi-bit digital signal;

a phase-locked loop control unit for outputting a reproduction clock that is in phase with clock components included in the reproduction signal using the multi-bit digital signal;

a filter for performing digital equalization to the multi-bit digital signal that is obtained by the A/D converter;

a filter coefficient learning unit for adaptively controlling filter coefficients of the filter in accordance with the digitally equalized signal to minimize an equalization error;

a signal quality judging unit for judging a quality of the reproduction signal; and a switching unit for changing a value of a correcting unit switching signal on the basis of a result of the judgment of the signal quality judging unit;

wherein said filter coefficient learning unit includes plural equalization error correcting units for correcting the equalization error when the reproduction signal of a deteriorated quality is to be equalized, and switching the plural equalization error correcting units according to the value of the correcting unit switching signal; and wherein said signal quality judging unit is operable to compare the number of times of error correction that is performed to data including errors which is obtained by binarizing the output signal from the filter, with a predetermined value, and to judge that the quality of the reproduction signal is deteriorated when the number of times of the error correction is larger than the predetermined value.

40. An optical disc player comprising:

a spindle motor for rotating an optical disc;

an optical pickup for reading a reproduction signal from the optical disc;

a reproduction signal processing apparatus for processing the reproduction signal that is read by the optical pickup;

a demodulation circuit for demodulating the signal that is processed by the reproduction signal processing apparatus to perform error correction;

a servo control circuit for controlling the spindle motor and the optical pickup; and a system controller for performing a data communication with an external device and controlling respective function blocks, said reproduction signal processing apparatus including:

an A/D converter for converting the reproduction signal that is read by the optical pickup into a multi-bit digital signal;

a phase-locked loop control unit for outputting a reproduction clock that is in phase with clock components included in the reproduction signal using the multi-bit digital signal;

a filter for performing digital equalization to the multi-bit digital signal that is obtained by the A/D converter;

a signal quality judging unit for judging a signal quality of the reproduction signal;

a filter coefficient learning unit having plural equalization error correcting units for correcting an equalization error when the signal quality judging unit judges that the quality of the reproduction signal is deteriorated, and adaptively controlling filter coefficients of the filter to minimize an equalization error in accordance with the digitally equalized signal; and a switching unit for changing a value of a correcting unit switching signal for switching the plural equalization error correcting units, using a result of the judgement by the signal quality judging unit;

a frequency divider for frequency-dividing the reproduction clock to generate a second reproduction clock;

an operation clock switching unit for selecting one of the reproduction clock and the second reproduction clock as an operation clock;

wherein said A/D converter is operable to sample the reproduction signal in a cycle of the operation clock, and said A/D converter, said phase-locked loop control unit, said filter, and said filter coefficient learning unit operate in accordance with the operation clock;

said filter coefficient learning unit including:

a provisional judgment unit for setting an equalization target value using the output signal from the filter;

an equalization error detection unit for detecting an equalization error using the equalization target value that is set by the provisional judgment unit and the output signal from the filter; and a filter coefficient operating unit for updating the filter coefficients using the equalization error that is detected by the equalization error detection unit and the multi-bit digital signal that is obtained by the A/D converter; and said provisional judgment unit including:

a first provisional judgment unit for setting the equalization target value using the reproduction clock;

a second provisional judgment unit for setting the equalization target value using the second reproduction clock; and a provisional judgment selection unit for selecting one of the first provisional judgment unit and the second provisional judgment unit on the basis of the result of the selection by the operation clock switching unit.

41. The optical disc player as defined in claim 40 wherein the first provisional judgment includes an adder for adding two successive output signals from the filter, and the equalization error correcting unit includes:

a first correcting unit for performing correction when a sign of the equalization target value that is set by the provisional judgment unit and a sign of the output signal from the filter are different from each other;

a second correcting unit for performing correction when a pattern of signs of three successive output signals from the adder is (positive, negative, positive) or (negative, positive, negative) in cases where the first provisional judgment unit is selected in the provisional judgment unit or when a pattern of signs of three output signals from the filter is (positive, negative, positive) or (negative, positive, negative) in cases where the second provisional judgment unit is selected in the provisional judgment unit; and a third correcting unit for performing correction when the equalization target value is set by the provisional judgment unit at a highest level among the plural equalization target values successively by a predetermined number of times or at a lowest level among the plural equalization target values successively by a predetermined number of times.

* * * * *